US011514613B2

(12) United States Patent
 Budagavi et al.

(10) Patent No.: US 11,514,613 B2
(45) Date of Patent: Nov. 29, 2022

(54) POINT CLOUD AND MESH COMPRESSION USING IMAGE/VIDEO CODECS

(71) Applicant: Samsung Electronics Co., Ltd., Gyeonggi-do (KR)

(72) Inventors: Madhukar Budagavi, Plano, TX (US); Esmaeil Faramarzi, Richardson, TX (US); Tuan Ho, Grand Prairie, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 460 days.

(21) Appl. No.: 15/920,038

(22) Filed: Mar. 13, 2018

(65) Prior Publication Data

US 2018/0268570 A1    Sep. 20, 2018

Related U.S. Application Data

(60) Provisional application No. 62/580,731, filed on Nov. 2, 2017, provisional application No. 62/556,579, filed on
(Continued)

(51) Int. Cl.
 *G06T 9/00* (2006.01)
 *G06T 15/04* (2011.01)
 *H04N 19/20* (2014.01)

(52) U.S. Cl.
 CPC .............. *G06T 9/001* (2013.01); *G06T 15/04* (2013.01); *H04N 19/20* (2014.11)

(58) Field of Classification Search
 None
 See application file for complete search history.

(56) References Cited

U.S. PATENT DOCUMENTS 8,731,313 B2    5/2014  Thiyanaratnam et al.
8,811,758 B2    8/2014  Paffenroth et al.
(Continued)

FOREIGN PATENT DOCUMENTS

EP    2951528 A2    12/2015
EP    2951528 B1    7/2018
(Continued)

OTHER PUBLICATIONS

Houshiar, Hamidreza, and Andreas Nüchter. "3D point cloud compression using conventional image compression for efficient data transmission." 2015 XXV International Conference on Information, Communication and Automation Technologies (ICAT). IEEE, 2015.*
(Continued)

*Primary Examiner* — Yanna Wu

(57) ABSTRACT

An decoding device, an encoding device and a method for point cloud encoding is disclosed. The method includes generating, from a three-dimensional point cloud, multiple two-dimensional frames, the two-dimensional frames including at least a first frame representing a geometry of points in the three-dimensional point cloud and a second frame representing texture of points in the three-dimensional point cloud. The method also includes generating an occupancy map indicating locations of pixels in the two-dimensional frames that represent points in the three-dimensional point cloud. The method further includes encoding the two-dimensional frames and the occupancy map to generate a compressed bitstream. The method also includes transmitting the compressed bitstream.

20 Claims, 21 Drawing Sheets

Related U.S. Application Data on Sep. 11, 2017, provisional application No. 62/530,750, filed on Jul. 10, 2017, provisional application No. 62/472,292, filed on Mar. 16, 2017.

(56) References Cited

U.S. PATENT DOCUMENTS

| | | | |
|---|---|---|---|
| 9,753,124 B2 | 9/2017 | Hayes | |
| 2006/0017730 A1 | 1/2006 | Meinds | |
| 2013/0329808 A1 | 12/2013 | Mohnen et al. | |
| 2015/0139535 A1 | 5/2015 | Siddiqui | |
| 2016/0086353 A1 | 3/2016 | Lukac et al. | |
| 2016/0134874 A1* | 5/2016 | Konieczny | H04N 19/597 375/240.08 |
| 2017/0103510 A1* | 4/2017 | Wang | G06T 7/0002 |
| 2017/0193699 A1* | 7/2017 | Mehr | G06T 7/194 |
| 2017/0347100 A1 | 11/2017 | Chou et al. | |
| 2019/0087978 A1* | 3/2019 | Tourapis | G06T 9/00 |
| 2019/0087979 A1* | 3/2019 | Mammou | H03M 7/30 |
| 2019/0156520 A1* | 5/2019 | Mammou | G06T 9/00 |

FOREIGN PATENT DOCUMENTS

| | | |
|---|---|---|
| WO | 2014171988 A2 | 10/2014 |
| WO | 2019055963 A1 | 3/2019 |

OTHER PUBLICATIONS

International Search Report dated Jul. 16, 2018 in connection with International Patent Application No. PCT/KR2018/003804.
Written Opinion of the International Searching Authority dated Jul. 16, 2018 in connection with International Patent Application No. PCT/KR2018/003804.
Cohen, R.A. et al., "Point Cloud Attribute Compression using 3-D Intra Prediction and Shape-Adaptive Transforms", Mitsubishi Electric Research Laboratories, Mar. 2016, 12 pages.
"Spherical Video V2 RFC (draft)", dated May 3, 2017, 11 pages. https://github.com/google/spatial-media/blob/master/docs/spherical-video-v2-rfc.md.
Budagavi et al., "OMAF: Extensible Polygon-based Projection Format (EPPF) for VR/360 Video", ISO/IEC JTC1/SC29/WG11 MPEG2017/m39947, Jan. 2017, 4 pages.
Extended European Search Report regarding Application No. 18832181.4, dated Apr. 22, 2020, 9 pages.
Golla et al., "Real-time Point Cloud Compression", 2015 IEEE/RSJ International Conference on Intelligent Robots and Systems (IROS), Sep. 2015, pp. 5087-5092.
Mammou et al., "Point Cloud Compression: Test Model Category 2 version 0.0", ISO/IEC JTC1/SC29/WG11 m41920, Oct. 2017, 7 pages.
Budagavi et al., "Samsung's response to CfP for Point Cloud Compression (Category 2)", ISO/IEC JTC1/SC29/WG11 MPEG2017/M41808, Oct. 2017, 10 pages.
Schwarz et al., "Nokia's response to CfP for Point Cloud Compression (Category 2)", ISO/IEC JTC1/SC29/WG11 MPEG2017/M41779, Oct. 2017, 22 pages.
Ochotta et al., "Compression of Point-Based 3D Models by Shape-Adaptive Wavelet Coding of Multi-Height Fields", SPBG'04: Proceedings of the First Eurographics Conference on Point-Based Graphics, Jun. 2004, pp. 103-112.
Lasserre, "What is point cloud compression?" Presentation, ISO/IEC JTC1/SC29/WG11, m40715, Apr. 2017, 20 pages.
European Patent Office, "Communication pursuant to Article 94(3) EPC", dated Feb. 11, 2021 in connection to European Patent Application No. EP18832181.4, 4 pages.
Examination report under sections 12 & 13 of the Patents Act, 1970 and the Patents Rules, 2003, in connection with Indian Patent Application No. 202017000352, dated May 29, 2021, 7 pages.

* cited by examiner

POINT CLOUD AND MESH COMPRESSION USING IMAGE/VIDEO CODECS

CROSS-REFERENCE TO RELATED APPLICATION AND CLAIM OF PRIORITY

This application claims priority under 35 U.S.C. § 119(e) to U.S. Provisional Patent Application No. 62/472,292 filed on Mar. 16, 2017; U.S. Provisional Patent Application No. 62/530,750 filed on Jul. 10, 2017; U.S. Provisional Patent Application No. 62/556,579 filed on Sep. 11, 2017; and U.S. Provisional Patent Application No. 62/580,731 filed on Nov. 2, 2017. The above-identified provisional patent application is hereby incorporated by reference in its entirety.

TECHNICAL FIELD

This disclosure relates generally to image processing. More specifically, this disclosure relates to an apparatus and a method for compressing and decompressing point clouds.

BACKGROUND

Three hundred sixty degree (360°) video is emerging as a new way of experiencing immersive video due to the ready availability of powerful handheld devices such as smartphones. 360° video enables immersive "real life," "being there" experience for consumers by capturing the 360° view of the world. Users can interactively change their viewpoint and dynamically view any part of the captured scene or object they desire. Display and navigation sensors track head movement in real-time to determine the region of the 360° video that the user wants to view. 360° video provides a three Degrees of Freedom (3DoF) immersive experience. (6DoF) is the next level of immersive experience where in the user can turn his head as well as move around in a virtual/augmented environment. Multimedia data that is 3-dimensional in nature, such as point clouds, is needed to provide 6DoF experience.

Point clouds and meshes are a set of three-dimensional (3-D) points that represent a model of a surface of an object or a scene. Point clouds are common in a variety of applications such as gaming, 3-D maps, visualizations, medical applications, augmented reality (AR), virtual reality (VR), autonomous driving, multi-view replay, 6DoF immersive media, to name a few. Point clouds, if uncompressed, generally require a large amount of bandwidth for transmission. Hence, the bitrate requirements are higher, necessitating the need for compression prior to transmission of a point cloud. Compression hardware and processes of point clouds are different than traditional compression hardware and processes for traditional two-dimensional (2-D) multimedia.

SUMMARY

This disclosure provides point cloud and mesh compression using image/video codecs.

In a first embodiment, a decoding device for point cloud decoding is provided. The decoding device includes a communication interface and a processor that is operably coupled to the communication interface. The communication interface configured to receive a compressed bitstream. The processor is configured to decode the compressed bitstream into two-dimensional frames and an occupancy map, wherein the two-dimensional frames include at least a first frame representing a geometry of points in a three-dimensional point cloud and a second frame representing a texture of points in the three-dimensional point cloud. The processor is also configured to identify the occupancy map indicating locations of pixels in the two-dimensional frames that represent each point in the three-dimensional point cloud. The processor is further configured to generate from the two-dimensional frames the three-dimensional point cloud using the occupancy map.

In another embodiment an encoding device for point cloud encoding is provided. The encoding device includes a processor and a communication interface operably coupled to the processor. The processor is configured to generate, from a three-dimensional point cloud, multiple two-dimensional frames, the two-dimensional frames including at least a first frame representing a geometry of points in the three-dimensional point cloud and a second frame representing a texture of points in the three-dimensional point cloud. The processor is also configured to generate an occupancy map indicating locations of pixels in the two-dimensional frames that represent points in the three-dimensional point cloud. The processor is further configured to encode the two-dimensional frames and the occupancy map to generate a compressed bitstream. The communication interface is configured to transmit the compressed bitstream.

In yet another embodiment a method for encoding is provided. The method includes generating, from a three-dimensional point cloud, multiple two-dimensional frames, the two-dimensional frames including at least a first frame representing a geometry of points in the three-dimensional point cloud. The method also includes generating other two-dimensional frames for point cloud attributes such as color, texture, normal, reflectance. Moreover the method includes generating an occupancy map indicating locations of pixels in the two-dimensional frames that represent points in the three-dimensional point cloud. The method further includes encoding the two-dimensional frames and the occupancy map to generate a compressed bitstream. The method also includes transmitting the compressed bitstream.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C"

includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read-only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
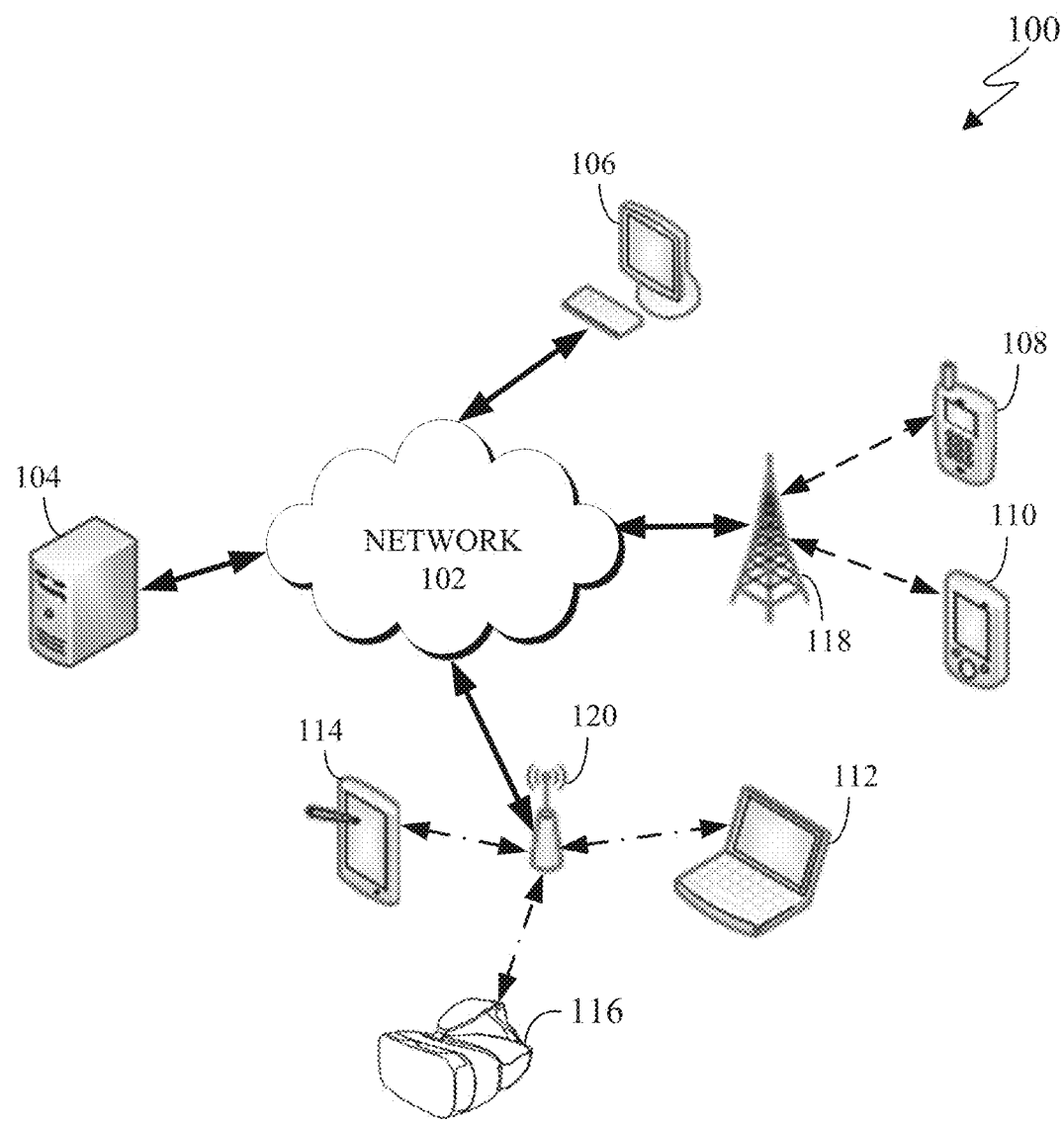
FIG. 1 illustrates an example communication system in accordance with embodiments of the present disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Virtual reality (VR) is a rendered version of a visual and audio scene. The rendering is designed to mimic the visual and audio sensory stimuli of the real world as naturally as possible to an observer or user as they move within the limits defined by the application. For example, VR places a user into immersive worlds that interact with their head movements. At the video level, VR is achieved by providing a video experience that covers as much of the field of view (FOV) as possible together with the synchronization of the viewing angle of the rendered video with the head movements. Although many different types of devices are able to provide such an experience, head-mounted displays are the most popular. Typically, head-mounted displays rely either on dedicated screens integrated into the device and running with external computers (tethered) or on a smartphone inserted into the HMD (untethered). The first approach utilizes lightweight screens and benefiting from a high computing capacity. In contrast, the smartphone-based systems utilizes higher mobility and can be less expensive to produce. In both instances, the video experience is generated the same.

A point cloud is a 3-D representation of an object that is similar to VR. Similarly, a point mesh is a 3-D representation of an object that is similar to VR. Generally, a point cloud is a collection of data points defined by a coordinate system. For example, in a 3-D Cartesian coordinate system, each point of a point cloud is identified by three coordinates, that of X, Y, and Z. When each point is identified by the three coordinates, a precise location in 3-D space is identified, relative to an origin point where the X, Y, and Z axes intersect. The points of a point cloud often represent the external surface of the object. Each point of a point cloud is defined by three coordinates and some attributes such as color, texture coordinates, intensity, normal, reflectance, and the like.

Similarly, a 3-D mesh is a 3-D representation of an object that is similar to a point cloud as well as VR. A 3-D mesh illustrates the external structure of an object that is built out of polygons. For example, a 3-D mesh is a collection of verities, edges, and faces that define the shape of an object.

For another example, a mesh (or a point cloud) can be rendered on spherical coordinate system and where each point is displayed throughout a sphere. In certain embodiments, each point can be located in the X, Y, Z coordinates within the sphere and texture coordinates U and V indicate a location of texture of the image. When the point cloud is rendered, the vertices of the mesh, the corresponding texture coordinate, and the texture image are inputted into a graphical processing unit which maps the mesh onto the 3-D geometry. The user can be placed at the center of the virtual sphere and sees a portion of the 360° scene corresponding to the viewport. In certain embodiments, alternative shapes can be used instead of a sphere such as a cube, an icosahedron, an octahedron, and the like. Point clouds and 3-D meshes are illustrated and discussed in greater detail below with reference to FIG. 4.

Point clouds and meshes are commonly used in a variety of applications, including gaming, 3-D mapping, visualization, medicine, augmented reality, VR, autonomous driving, multiview replay, 6 degrees of freedom immersive media, to name a few. As used hereinafter, the term 'point cloud' also refers to a '3-D point cloud,' and a '3-D mesh.'

Transmitting a point cloud, from one electronic device to another, often requires significant bandwidth due to the size and complexity of the data associated with a single point cloud. The transmission of a point cloud often requires specific compression techniques to reduce the size of the data prior to transmission. For example, compressing a point cloud can require dedicated hardware or specific compression algorithms or a combination thereof. Compression algorithms for a point cloud are different than compression algorithms of other multimedia forms, such as images and video, VR, and the like.

According to embodiments of the present disclosure, architecture for carrying out a point cloud compression using a video codec is provided. According to embodiments of the present disclosure, architecture for carrying out a point cloud compression using an image codec is provided. According to embodiments of the present disclosure, a point cloud is deconstructed, and multiple 2-D frames are generated that represent the geometry of each point of the point cloud, as well as various attributes of the point cloud. For example, the point cloud can be deconstructed and mapped onto a 2-D frame. The 2-D frame can be compressed using various video or image or both compression.

FIG. 1 illustrates an example computing system 100 according to this disclosure. The embodiment of the system 100 shown in FIG. 1 is for illustration only. Other embodiments of the system 100 can be used without departing from the scope of this disclosure.

The system 100 includes network 102 that facilitates communication between various components in the system 100. For example, network 102 can communicate Internet Protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

The network 102 facilitates communications between a server 104 and various client devices 106-116. The client devices 106-116 may be, for example, a smartphone, a tablet computer, a laptop, a personal computer, a wearable device, or a head-mounted display (HMD). The server 104 can represent one or more servers. Each server 104 includes any suitable computing or processing device that can provide computing services for one or more client devices. Each server 104 could, for example, include one or more processing devices, one or more memories storing instructions and data, and one or more network interfaces facilitating communication over the network 102. As described in more detail below, the server 104 transmits a point cloud to one or more users.

Each client device 106-116 represents any suitable computing or processing device that interacts with at least one server or other computing device(s) over the network 102. In this example, the client devices 106-116 include a desktop computer 106, a mobile telephone or mobile device 108 (such as a smartphone), a personal digital assistant (PDA) 110, a laptop computer 112, a tablet computer 114, and a HMD 116. However, any other or additional client devices could be used in the system 100.

In this example, some client devices 108-116 communicate indirectly with the network 102. For example, the client devices 108 and 110 (mobile devices 108 and PDA 110, respectively) communicate via one or more base stations 118, such as cellular base stations or eNodeBs (eNBs). Mobile device 108 includes smartphones. Also, the client devices 112, 114, and 116 (laptop computer, tablet computer, and HMD, respectively) communicate via one or more wireless access points 120, such as IEEE 802.11 wireless access points. As described in more detail below the HMD 116 can display a 360° view of a point cloud. Note that these are for illustration only and that each client device 106-116 could communicate directly with the network 102 or indirectly with the network 102 via any suitable intermediate device(s) or network(s). In certain embodiments, server 104 or any client device 106-114 can be used to compress a point cloud and transmit the data to another client device such as any client device 106-116.

In certain embodiments, the mobile device 108 (or any other client device 106-116) can transmit information securely and efficiently to another device, such as, for example, the server 104. The mobile device 108 (or any other client device 106-116) can function as a VR display when attached to a headset via brackets, and function similar to HMD 116. The mobile device 108 (or any other client device 106-116) can trigger the information transmission between itself and server 104.

Although FIG. 1 illustrates one example of a system 100, various changes can be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

The processes and systems provided in this disclosure allow for a client device 106-116 or the server 104 to compress, transmit, receive, render a point cloud, or a combination thereof. For example, the server 104 can then compress and transmit the point cloud data to client devices 106-116. For another example, any client device 106-116 can compress and transmit point cloud data to any client devices 106-116.

Figure 2:
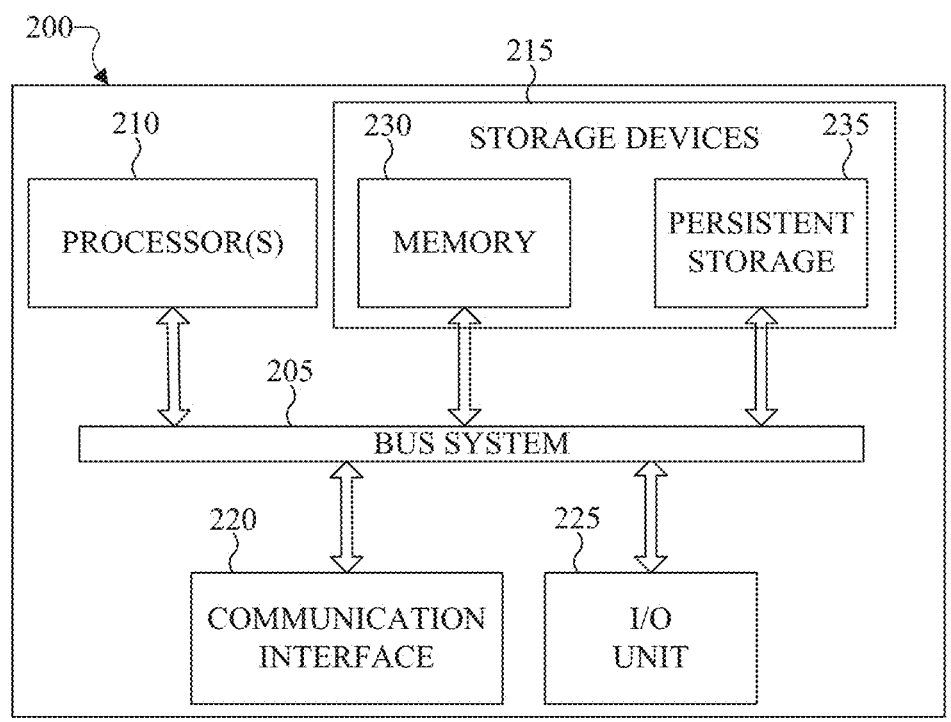
FIG. 2 illustrates an example electronic device in accordance with an embodiment of this disclosure.
Figure 3:
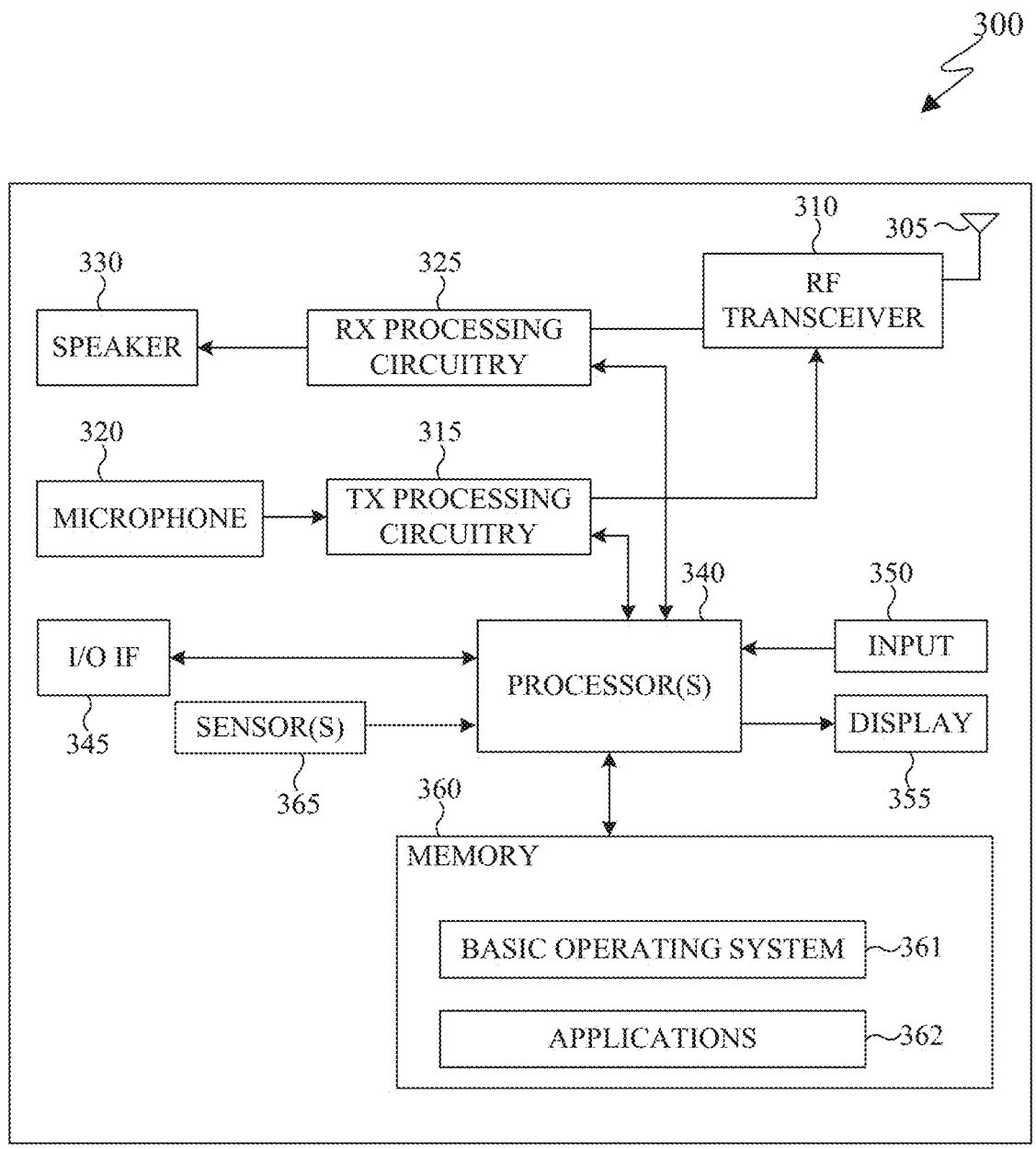
FIG. 3 illustrates an example electronic device in accordance with an embodiment of this disclosure.

FIGS. 2 and 3 illustrate example devices in a computing system in accordance with an embodiment of this disclosure. In particular, FIG. 2 illustrates an example server 200, and FIG. 3 illustrates an example electronic device 300. The server 200 could represent the server 104 of FIG. 1, and the electronic device 300 could represent one or more of the client devices 106-116 of FIG. 1.

Server 200 can represent one or more local servers, one or more compression servers, or one or more encoding servers. As shown in FIG. 2, the server 200 includes a bus system 205 that supports communication between at least one processor(s) 210, at least one storage device(s) 215, at least one communications interface 220, and at least one input/output (I/O) unit 225.

The processor 210 executes instructions that can be stored in a memory 230. The instructions stored in memory 230 can include instructions for decomposing a point cloud, compressing a point cloud. The instructions stored in memory 230 can also include instructions for encoding a point cloud in order to generate a bitstream. The instructions stored in memory 230 can also include instructions for rendering the point cloud on an omnidirectional 360° scene, as viewed through a VR headset, such as HMD 116 of FIG. 1. The processor 210 can include any suitable number(s) and type(s) of processors or other devices in any suitable arrangement. Example types of processor(s) 210 include microprocessors, microcontrollers, digital signal processors, field programmable gate arrays, application specific integrated circuits, and discrete circuitry.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). The persistent storage 235 can contain one or more components or devices supporting longer-term storage of data, such as a ready-only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s).

The I/O unit 225 allows for input and output of data. For example, the I/O unit 225 can provide a connection for user input through a keyboard, mouse, keypad, touchscreen, motion sensors, or any other suitable input device. The I/O unit 225 can also send output to a display, printer, or any other suitable output device.

In certain embodiments, server 200 implements the compression of a point cloud, as will be discussed in greater detail below. In certain embodiments, server 200 generates multiple 2-D frames that correspond to the three dimensions of the point cloud. In certain embodiments, server 200 maps the three dimensions of a point cloud into 2-D. In certain embodiments, server 200 generates a compressed bitstream by encoding the compressed two-dimensional frames that represent the point cloud.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an electronic device 300 in accordance with an embodiment of this disclosure. The embodiment of the electronic device 300 shown in FIG. 3 is for illustration only, and other embodiments could be used without departing from the scope of this disclosure. The electronic device 300 can come in a wide variety of configurations, and FIG. 3 does not limit the scope of this disclosure to any particular implementation of an electronic device. In certain embodiments, one or more of the client devices 106-116 of FIG. 1 can include the same or similar configuration as electronic device 300. In certain embodiments, electronic device 300 can be an encoder and a decoder.

In certain embodiments, electronic device 300 is usable with data transfer, image or video compression, image or video decompression, encoding, decoding, and media rendering applications. The electronic device 300 can be a mobile communication device, such as, for example, a wireless terminal, a desktop computer (similar to desktop computer 106 of FIG. 1), a mobile device (similar to mobile device 108 of FIG. 1), a PDA (similar to PDA 110 of FIG. 1), a laptop (similar to laptop computer 112 of FIG. 1), a tablet (similar to tablet computer 114 of FIG. 1), a head-mounted display (similar to HMD 116 of FIG. 1), and the like.

As shown in FIG. 3, the electronic device 300 includes an antenna 305, a radio-frequency (RF) transceiver 310, a transmit (TX) processing circuitry 315, a microphone 320, and a receive (RX) processing circuitry 325. The electronic device 300 also includes a speaker 330, a one or more processors 340, an input/output (I/O) interface (IF) 345, an input 350, a display 355, and a memory 360. The memory 360 includes an operating system (OS) 361 and one or more applications 362.

The RF transceiver 310 receives, from the antenna 305, an incoming RF signal transmitted by another component on a system. For example, the RF transceiver 310 receives RF signal transmitted by a BLUETOOTH or WI-FI signal from an access point (such as a base station, Wi-Fi router, Bluetooth device) of the network 102 (such as a WI-FI, BLUETOOTH, cellular, 5G, LTE, LTE-A, WiMAX, or any other type of wireless network). The RF transceiver 310 can down-convert the incoming RF signal to generate an intermediate frequency or baseband signal. The intermediate frequency or baseband signal is sent to the RX processing circuitry 325 that generates a processed baseband signal by filtering, decoding, or digitizing the baseband or intermediate frequency signal, or a combination thereof. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, digitizes, or a combination thereof, the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices and execute the OS 361 stored in the memory 360 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 is also capable of executing other applications 362 resident in the memory 360, such as decompressing and generating a received point cloud.

The processor 340 can execute instructions that are stored in a memory 360. The processor 340 can include any suitable number(s) and type(s) of processors or other devices in any suitable arrangement. For example, in some embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive, store, and timely instruct by providing image capturing and processing. The processor 340 can move data into or out of the memory 360 as required by an executing process. In some embodiments, the processor 340 is configured to execute the plurality of applications 362 based on the OS 361 or in response to signals received from eNBs or an operator. The processor 340 is also coupled to the I/O interface 345 that provides the electronic device 300 with the ability to connect to other devices, such as client devices 106-116. The I/O interface 345 is the communication path between these accessories and the processor 340.

The processor 340 is also coupled to the input 350. The operator of the electronic device 300 can use the input 350 to enter data or inputs into the electronic device 300. Input 350 can be a keyboard, touch screen, mouse, track-ball, voice input, or any other device capable of acting as a user interface to allow a user in interact with electronic device 300. For example, the input 350 can include voice recognition processing thereby allowing a user to input a voice command via microphone 320. For another example, the input 350 can include a touch panel, a (digital) pen sensor, a key, or an ultrasonic input device. The touch panel can recognize, for example, a touch input in at least one scheme among a capacitive scheme, a pressure sensitive scheme, an infrared scheme, or an ultrasonic scheme. For example, in the capacitive scheme, the input 350 can recognize touch or proximity. The input 350 can also include a control circuit. Input 350 can be associated with sensor(s) 365 and/or a camera by providing additional input to processor 340. As discussed in greater detail below, sensor 365 includes inertial sensors (such as accelerometers, gyroscope, and magnetometer), optical sensors, motion sensors, cameras, pressure sensors, heart rate sensors, altimeter, and the like. For example, input 350 can utilize motion as detected by a motion sensor, associated with sensor 365, as an input.

The processor 340 is also coupled to the display 355. The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. Display 355 can be sized to fit within a HMD. Display 355 can be a singular display screen or multiple display screens capable of creating a stereoscopic display. In certain embodiments, display 355 is a heads-up display (HUD).

The memory 360 is coupled to the processor 340. Part of the memory 360 could include a random access memory (RAM), and another part of the memory 360 could include a Flash memory or other read-only memory (ROM).

The memory 360 can include persistent storage (not shown) that represents any structure(s) capable of storing and facilitating retrieval of information (such as data, program code, and/or other suitable information on a temporary or permanent basis). The memory 360 can contain one or more components or devices supporting longer-term storage of data, such as a ready only memory, hard drive, Flash memory, or optical disc.

Electronic device 300 can further include one or more sensors 365 that meter a physical quantity or detect an activation state of the electronic device 300 and convert metered or detected information into an electrical signal. For example, sensor(s) 365 may include one or more buttons for touch input (located on the headset or the electronic device 300), one or more cameras, a gesture sensor, an eye tracking sensor, a gyroscope or gyro sensor, an air pressure sensor, a magnetic sensor or magnetometer, an acceleration sensor or accelerometer, a grip sensor, a proximity sensor, a color sensor (such as a Red Green Blue (RGB) sensor), a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, and the like. The sensor(s) 365 can further include a control circuit for controlling at least one of the sensors included therein. As will be discussed in greater detail below, one or more of these sensor(s) 365 may be used to control a user interface (UI), detect UI inputs, determine the orientation and facing the direction of the user for three-dimensional content display identification, etc. Any of these sensor(s) 365 may be located within the electronic device 300, within a secondary device operably connected to the electronic device 300, within a headset configured to hold the electronic device 300, or in a singular device where the electronic device 300 includes a headset.

As will be discussed in greater detail below, in this illustrative embodiment, electronic device 300 receives an encoded and compressed bitstream. The electronic device 300 decodes the compressed bitstream into multiple 2-D frames. In certain embodiments, the decoded bitstream also includes an occupancy map. The electronic device 300 decompresses the multiple 2-D frames. The multiple 2-D frames can include a frame that indicates coordinates of each point of a point cloud. A frame can include the location of each geometric point of the point cloud. For example, the frame can include a pictorial depiction of each geometric point of the point cloud as represented in 2-D. Another frame can include an attribute of each point such as color. The electronic device 300 can then generate the point cloud in three dimensions.

As will be discussed in greater detail below, in this illustrative embodiment, electronic device 300 can be similar to server 200 and encode a point cloud. The electronic device 300 can generate multiple 2-D frames that represent the geometry and texture or color or both of the point cloud. The point cloud can be mapped to the 2-D frame. For example, one frame can include the geometric points. In another example, another frame can include the texture or color or both of the point cloud. The electronic device 300 can compress the 2-D frames. The electronic device 300 can generate an occupancy map to indicate the location of valid pixels within each frame. The electronic device 300 can encode the frames to generate a compressed bitstream.

Although FIGS. 2 and 3 illustrate examples of devices in a computing system, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication networks, electronic devices and servers can come in a wide variety of configurations, and FIGS. 2 and 3 do not limit this disclosure to any particular electronic device or server.

Figure 4:
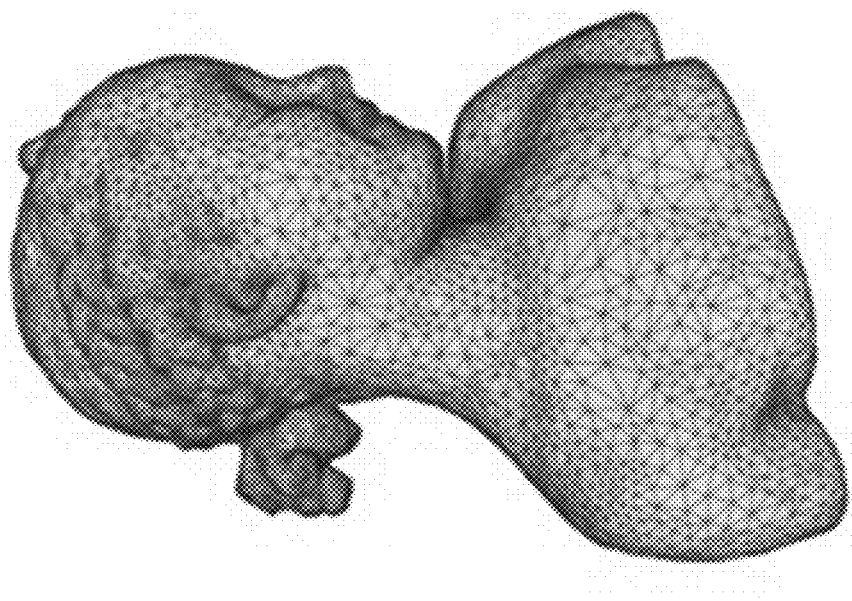
FIG. 4 illustrates a point cloud and an example mesh in accordance with an embodiment of this disclosure.
Figure 4:
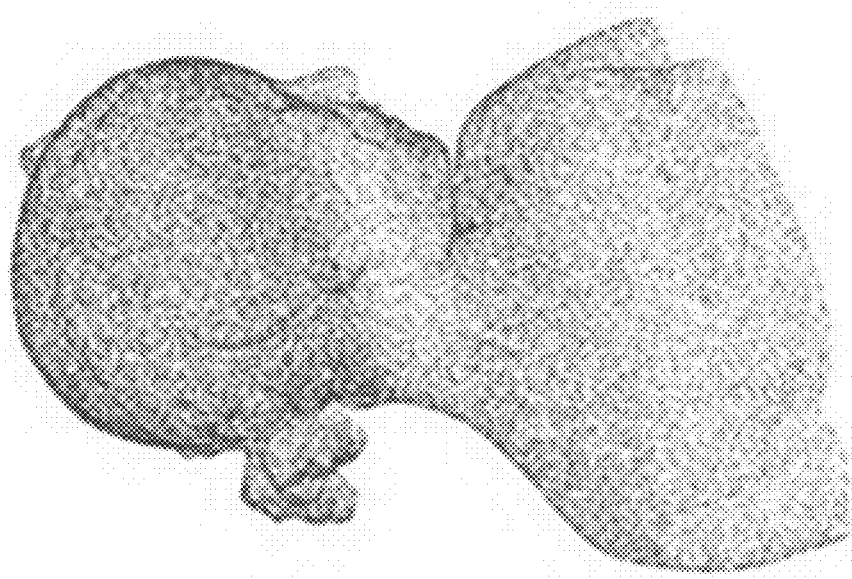

FIG. 4 illustrates a point cloud and an example mesh in accordance with an embodiment of this disclosure. Point cloud 405 depicts an illustration of a point cloud. A point cloud is digitized data that visually defines an object in 3-D space. As depicted the point cloud 405 each point represents an external coordinate of the object, similar to a topographical map. The coordinate of each point has a geographical location as well as an attribute. The attribute can be color, intensity, texture, and the like.

Similarly, mesh 410 depicts an illustration of a 3-D mesh. The mesh is a digitized data that visually defines an object in 3-D space. The object is defined by many polygons. Each polygon can portray various information, such as topological, geometrical, attribute (such as color, texture, and the like), and the like. For example, topological data provide connectivity information among vertices such as adjacency of vertices, edges, and faces. Geometrical information provides the geometric location of each vertex in 3-D space. Attribute information provides the normal, color, and application dependent information for each individual vertex. The vertices of each polygon are similar to the points in the point cloud 405. Each polygon of the mesh 410 represents the external surface of the object.

Point clouds and meshes, similar to point cloud 405 and mesh 410, require substantial bandwidth to transmit from one computing device to another. Compression is necessary to reduce storage and bandwidth requirements. For example, lossy compression can compress a Point cloud and mesh while maintaining the distortion within a tolerable level while reducing the size of the data.

FIGS. 5A, 5B, 6A, 6B, 7A, 7B, 8A, and 8B illustrate an example block diagram of an encoder or decoder in accordance with embodiments of this disclosure. Specifically, FIGS. 5A, 6A, 7A, and 8A illustrate example encoders while FIGS. 5B, 6B, 7B, and 8B illustrate example decoders. The encoders of FIGS. 5A, 6A, 7A, and 8A can be similar to the server of FIG. 1, any of the client devices 106-116 of FIG. 1, the server 200 of FIG. 2, and the electronic device 300 of FIG. 3. The decoders of FIGS. 5B, 6B, 7B, and 8B can be similar to any of the client devices 106-116 of FIG. 1 and the electronic device 300 of FIG. 3. The encoders of FIGS. 5A, 6A, 7A, and 8A can communicate via network 102 to any decoders of FIGS. 5B, 6B, 7B, and 8B. The embodiment of the encoders as shown in FIGS. 5A, 6A, 7A, and 8A and the decoders as shown in FIGS. 5B, 6B, 7B, and 8B are for illustration only. Other embodiments could be used without departing from the scope of the present disclosure.

The encoders of FIGS. 5A, 6A, 7A, and 8A can compress, encode, and transmit a point cloud or a mesh, or both. In certain embodiments, the encoders of FIGS. 5A, 6A, 7A, and 8A generate multiple 2-D frames in which a point cloud or a 3-D mesh is mapped or projected onto. For example, the point cloud is unwrapped and mapped onto the 2-D frame. For example, the point cloud can be unwrapped along one axis (such as the Y-axis), and the image is mapped along the remaining axis (such as X and Z axis). In certain embodiments, the encoders of FIGS. 5A, 6A, 7A, and 8A generate an occupancy map that indicates where each pixel of the point cloud is located when the point cloud is mapped onto the 2-D frame. In certain embodiments, encoders of FIGS. 5A, 6A, 7A, and 8A are a web server, a server computer such as a management server, or any other electronic computing system capable of, mapping the three dimensions of a point cloud into two dimensions, compressing encoders of FIGS. 5A, 6A, 7A, and 8A the 2-D images, and encoding the images for transmission. In certain embodiments, each encoder of FIGS. 5A, 6A, 7A, and 8A are a "cloud" of computers interconnected by one or more networks, where each is a computing system utilizing clustered computers and components to act as a single pool of seamless resources when accessed through network 102 of FIG. 1.

The decoders of FIGS. 5B, 6B, 7B, and 8B can decode, decompress, and generate a received point cloud or a mesh, or both. In certain embodiments, the decoders of FIGS. 5B, 6B, 7B, and 8B generate multiple point clouds from a received bitstream that includes 2-D frames. For example, each of the pixels of the point cloud can be mapped based on the information received in the 2-D frames and a received occupancy map.

Figure 5A:
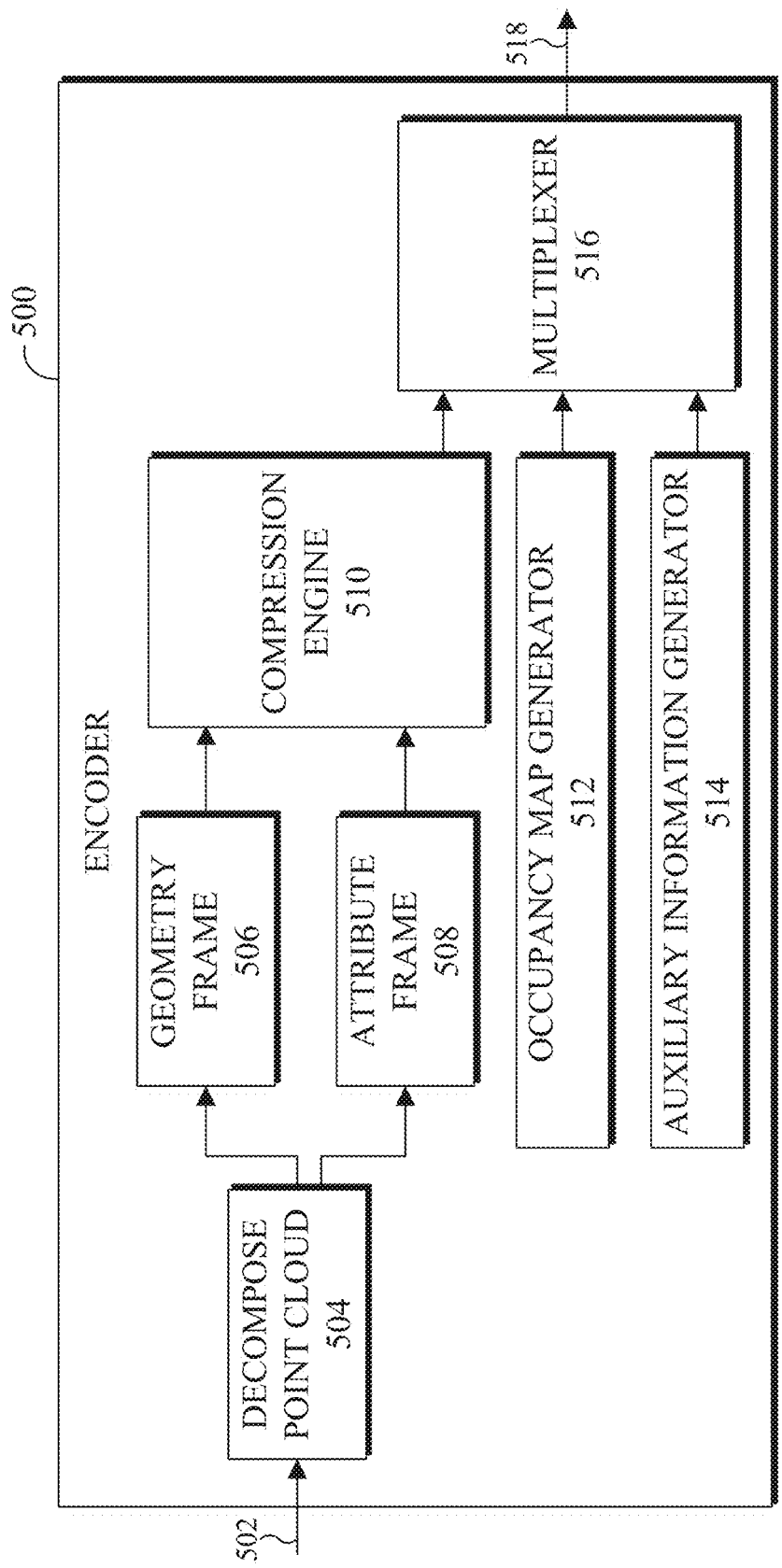
FIG. 5A illustrates an example block diagram of an encoder in accordance with an embodiment of this disclosure.

FIG. 5A illustrates encoder 500. Encoder 500 illustrates a high-level overview of an embodiment of the present disclosure of an electronic device that encodes and compresses a point cloud for transmission. In certain embodiments, encoder 500 packages a point cloud for transmission by a bitstream to one or more decoders. Encoder 500 includes a decompose point cloud 504, a compression engine 510, includes an occupancy map generator 512, an auxiliary information generator 514, and a multiplexer 516. The decompose point cloud 504 generates a geometry frame 506 and an attribute frame 508.

Encoder 500 receives a point cloud 502 via an input. The input of the point cloud 502 can be accessed via an information repository or receives via a transmission from another electronic device.

The input of the point cloud 502 enters the encoder 500 and is mapped by the decompose point cloud 504. In certain embodiments, the decompose point cloud is similar to a demultiplexer as it separates various features of the received input. For example, the decompose point cloud 504 can separate the geometry of the point cloud, and other attributes of the point cloud. The attributes can include color, texture, intensity, normal, reflection, and the like. The decompose point cloud 504 is a mapping function that maps the point cloud 502 onto one or more 2-D frames. For example, the decompose point cloud 504 generates two frames a geometry frame 506 and an attribute frame 508. In certain embodiments, additional frames (not shown) are generated by the decompose point cloud 504. In certain embodiments, the decompose point cloud 504 maps the point cloud into a frame of a video. For example, each pixel of the X coordinates of the point cloud can be mapped onto the R component of the video frame, where the R component of the video frame is the red color portion of a video. Similarly, each pixel of the Y coordinates of the point cloud can be mapped onto the G component of the video frame, where the G component of the video frame is the green color portion of a video. Similarly, each pixel of the Z coordinates of the point cloud can be mapped onto the B component of the video frame, where the B component of the video frame is the blue color portion of a video. That is, the R, G, and B video frames include the geometry of the point cloud mapped onto the 2-D of each video frame. Similarly, additional video frames can include various attributes of each pixel such as color, intensity, texture, and the like. For example, the point cloud attributes can be mapped on different regions of the same video picture. In another example, the point cloud attributes can be mapped on separate video frames.

The geometry frame 506 is the geometric location of each pixel of the point cloud. For example, the geometry frame 506 is a mapping of the 3-D locations of the point-cloud points onto the two dimensions of a video frame. In certain embodiments, the geometry frame 506 indicates all three dimensions on a two-dimensional projection. In certain embodiments, not all three XYZ coordinates of the points are stored in the geometry frame 506. For example, the geometry frame 506 stores two of the three XYZ coordinates in such a way that the missing coordinate(s) can be determined. For instance, the Y coordinate is not stored on the geometry frame 506 but the X and Z coordinates are stored such that the Y coordinate can be determined from the row number of the pixel storing the X and Z coordinates within the 2D frame. The attribute frame 508 stores an attribute such as the RGB color of each pixel of the point cloud. In certain embodiments, the attribute frame 508 stores an attribute such as the color or the texture of each pixel of the point cloud. In certain embodiments, the attributes frame 508 can include multiple frames. For example, the each individual attribute frame can indicate a color, normal, texture coordinates, material properties, intensity, and the like.

The geometry frame 506 and the attribute frame 508 are compressed by the compression engine 510. The compression engine 510 can be a video compression codec or an image compression codec. In certain embodiments, the compression engine 510 compresses the received frames by a codec such as HEVC, SHVC, AVC, SVC, VP9, VP8 JVET, AVC, JPEG, and the like. In certain embodiments, the compression engine 510 compresses each frame (geometry frame 506 and the attribute frame 508) individually and send each compressed frame to the multiplexer 516. In certain embodiments, the compression engine 510 compresses all the received frames together (such as the geometry frame 506 and the attribute frame 508) and send the frames together to the multiplexer 516.

The occupancy map generator 512 generates a binary mask. The occupancy map generator 512 analyzes the received point cloud 502, the geometry frame 506 and the attribute frame 508 and identifies valid and invalid points of each frame. The generated binary mask indicates whether each pixel on each frame (the geometry frame 506 and the attribute frame 508) is a valid pixel or blank. For example, the binary mask is used to determine the region of the video frame that contains valid point cloud attribute information. The region and therefore the generated binary mask to which the region corresponds to can be the same for all projected attributes, or it could be different for a portion of the attributes. For example, the occupancy map generator 512 can generate a single binary mask that indicates valid pixels for all attributes. In another example, the occupancy map generator 512 can generate multiple binary masks that indicate valid pixels for each attribute. In certain embodiments, the generated binary mask is also inputted into the compression engine 510. For example, the generated binary mask can be compressed as another 2-D frame similar to the geometry frame 506 or the attribute frame 508. In certain embodiments, the generated binary mask can be multiplexed with the compressed 2-D frames and transmitted as metadata with the compressed 2-D frames, as a single bitstream. In certain embodiments, the generated binary mask can be transmitted as metadata as a separate bitstream. The generated binary mask is described in further detail below with reference to FIG. 9.

The auxiliary information generator 514 generates metadata that is transmitted with the compressed geometry frame 506 and the compressed attribute frame 508. The auxiliary information that is generated by the auxiliary information generator 514 is generated metadata that can be used by a decoder, to generate and render the three dimensions of the point cloud from the 2-D frames. For example, the auxiliary information generator 514 generates data that relates the information of the geometry frame 506 and the information of the attribute frame 508 of each point in the point cloud. In certain embodiments, the auxiliary information generator 514 generates a look-up table. In certain embodiments, the auxiliary information generated by the auxiliary information generator 514 can be added to the encoded bitstream by the video encoders as metadata. For example, the metadata can be added to the encoded bitstream using a SEI message. In certain embodiments, the auxiliary information generated by the auxiliary information generator 514 can be encoded by non-video-based encoding methods, such as octree. In certain embodiments, the auxiliary information generated by the auxiliary information generator 514 can be added by the multiplexer 516) to the encoded bitstream 518 without any encoding.

The multiplexer 516 combines the inputs from the compression engine 510, the occupancy map generator 512, and the auxiliary information generator 514 and creates a single output, such as bitstream 518.

In certain embodiments, the geometries of the geometry frame 506 and the attribute frame 508 can be tuned to a particular video frame in order to improve the efficiency of the compression engine 510. For example, the geometries of the geometry frame 506 and the attribute frame 508 can be transmitted with the video or every frame of the video. For instance, the transmitted bitstream 518 can include a mesh box scheme of spherical video V2 RFC. In another instance, the transmitted bitstream 518 can include an extensible polygon-based projection format (EPPF). Both the spherical video V2 RFC and the EPPF store the vertex and texture coordinates in a list in combination with relevant video and audio data.

Figure 5B:
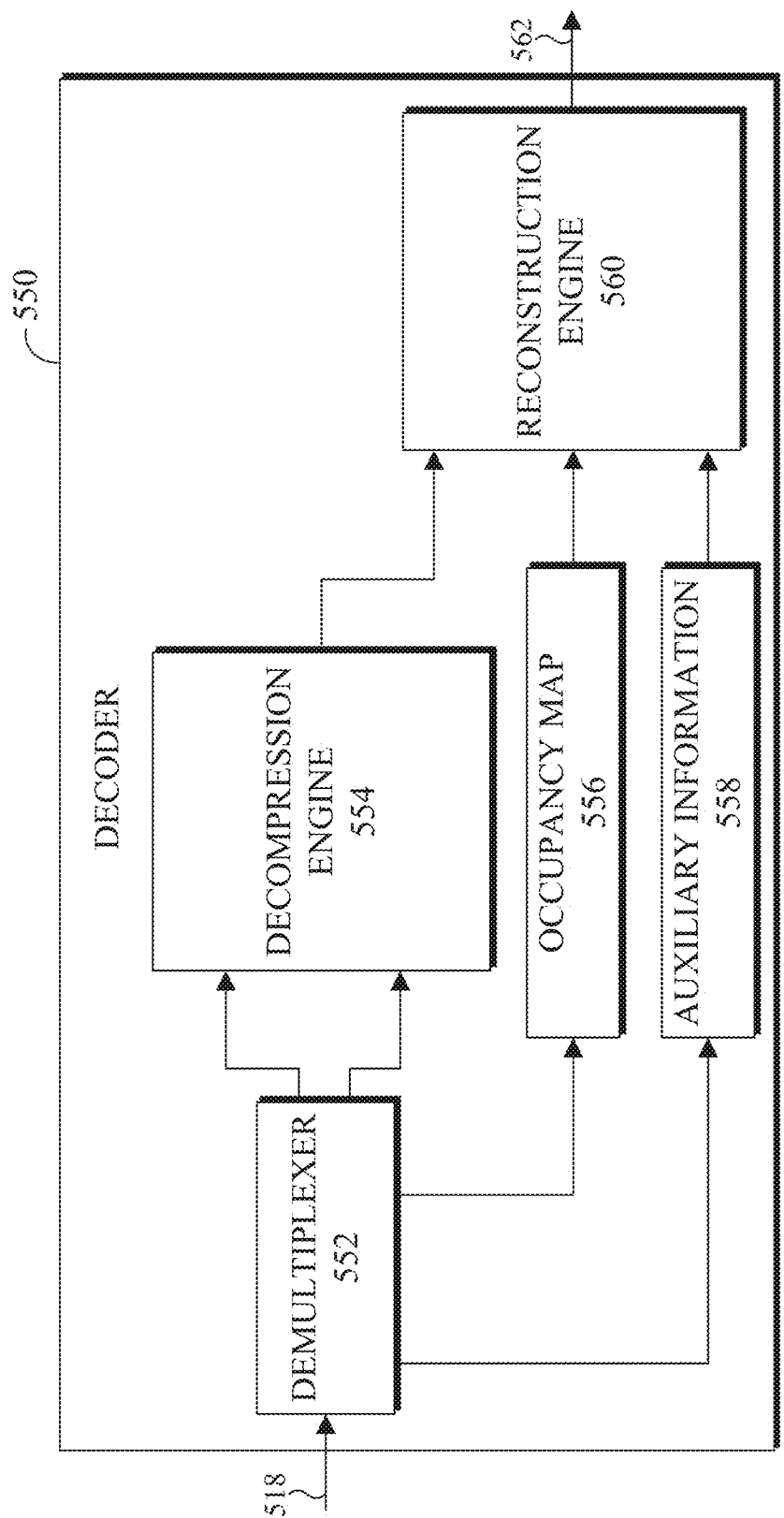
FIG. 5B illustrates an example block diagram of a decoder in accordance with an embodiment of this disclosure.

FIG. 5B illustrates decoder 550. Decoder 550 illustrates a high-level overview of an embodiment of the present disclosure of an electronic device that decodes and generates the point cloud. In certain embodiments, the decoder extracts the compressed geometry and attributes from the bitstream. In certain embodiments, the decoder 550 maps the geometry and attribute to generate the point cloud. The decoder 550 includes a demultiplexer 552, a decompression engine 554, and a reconstruction engine 560.

The demultiplexer 552 is a component that takes the single input such as bitstream 518 and routes it to one of several output lines. Specifically, the demultiplexer 552 receives the bitstream 518 and extracts the frames (such as the geometry frame 506 and the attribute frame 508), the occupancy map 556, and the auxiliary information 558.

The decompression engine 554 decompresses the geometry frame 506 and the attribute frame 508. In certain embodiments, the decompression engine 554 produces an exact replication of the original pre-compressed frames. In certain embodiments, the decompression engine 554 produces a similar replication of the original pre-compressed frames. That is, the decompression engine 554 reverses the effects of the compression engine 510 of the encoder.

The occupancy map 556 is the generated binary map. The occupancy map 556 identifies valid and invalid pixels of each frame. The binary mask indicates which pixels of each frame contain information regarding the generation of the three dimensions of the point cloud from the 2-D frames.

Additional details regarding the binary map are described in further detail below with reference to FIG. 9.

The auxiliary information 558 is metadata that is used by the reconstruction engine 560 to generate and render the point cloud. For example, the auxiliary information includes data that relates the geometry frame 506 and the attribute frame 508 to each point in the point cloud. In certain embodiments, the auxiliary information 558 is a look-up table.

The reconstruction engine 560 reconstructs the three-dimensional shape of the point cloud based on the decompressed 2-D frames, the occupancy map 556, and the auxiliary information 558. The reconstruction engine 560 generates the three-dimensional point cloud. The generated point cloud can then be transmitted to a display (similar to display 355 of FIG. 1) via an output.

Figure 6A:
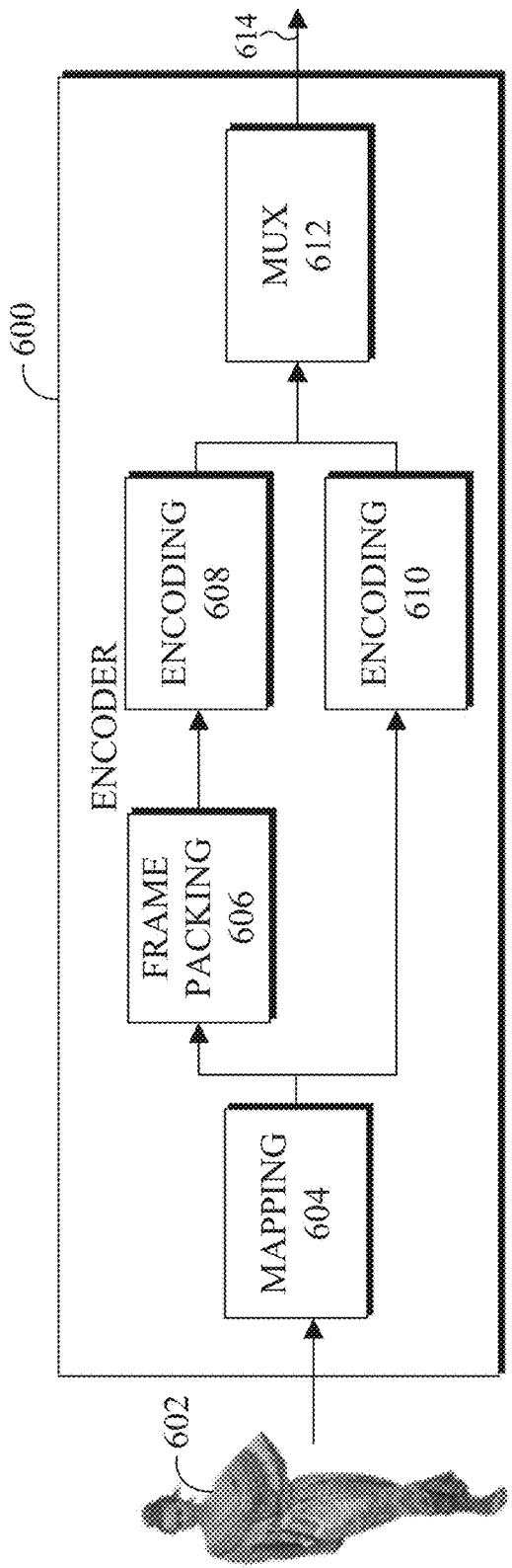
FIG. 6A illustrates an example block diagram of an encoder in accordance with an embodiment of this disclosure.
Figure 6B:
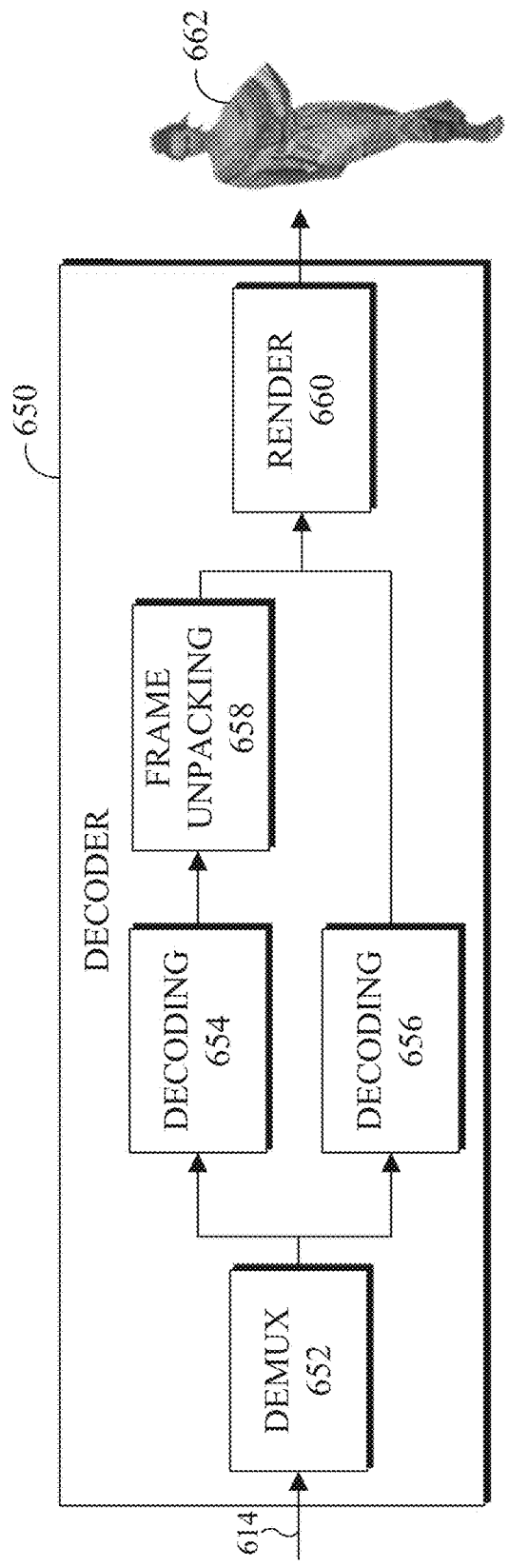
FIG. 6B illustrates an example block diagram of a decoder in accordance with an embodiment of this disclosure.

FIG. 6A illustrates encoder 600. Encoder 600 illustrates a high-level overview of an embodiment of the present disclosure of an electronic device that encodes and compresses a point cloud for transmission. Encoder 600 is similar to encoder 500 of FIG. 5A. Encoder 600 includes mapping 604, encoding 608 and 610, and a multiplexer 612. The point cloud 602 is the input into the encoder 600, and bitstream 614 is the output. Similarly FIG. 6B illustrates decoder 650. Decoder 650 is similar to decoder 550 of FIG. 5B. Decoder 650 illustrates a high-level overview of an embodiment of the present disclosure of an electronic device that decodes the compressed point cloud of the encoder 600. Decoder 650 includes a demultiplexer 652, decoding 654 and 656, frame unpacking 658 and renderer 660. The input is the same or similar bitstream 614 from encoder 600, and the output is the generated point cloud 662.

Mapping 604 maps the point cloud 602 into two dimensions. In certain embodiments, the mapping 604 separates the geometry values and attribute values of the point cloud 602. For example, the X, Y, and Z geometry components which correspond to the 3-D coordinates of each pixel are stored in a separate frame than the R, G, and B color components which correspond to the color attribute of each respective pixel. The frame containing the geometry information is sent to the frame packing 606 while the frame containing the color information is sent to the encoding 610.

In certain embodiments, mapping 604 maps the geometry and the color components of the point cloud to images that are then encoded using an image or video codec via encoding 608 or 610. For example, mapping 604 can map the vertex and the texture coordinates to an image. For instance, the latitude of the points can correspond to the row number while the longitude of points can correspond to the column number in the image. Converting the Cartesian coordinates of X, Y, and Z to the spherical coordinates of r, θ, and y can be performed using the following equations.

Equations:

$$r = \sqrt{X^2 + Y^2 + Z^2}$$

$$\theta = \tan^{-1}\left(\frac{Y}{X}\right)$$

$$\theta = \tan^{-1}\left(\frac{\sqrt{X^2 + Y^2}}{Z}\right)$$

The above equations depict θ as the latitude or row number and y is the longitude or column number in the image. The above equations can yield two separate images I and T. Two separate images I and T are used to store the (X, Y, Z) and (U, V) coordinates respectively. In certain embodiments, X, Y, and Z are vertex coordinates depicting the vertices of an object in three dimensions, while U, and V denote the texture coordinates when the 3-D texture is mapped onto 2-D. For example:

$$I_R(\theta,\varphi)=X$$

$$I_G(\theta,\varphi)=Y$$

$$I_B(\theta,\varphi)=Z$$

$$T_R(\theta,\varphi)=U$$

$$T_G(\theta,\varphi)=V$$

Mapping 604 initially maps the point cloud from the 3-D space to 2-D planes. In certain embodiments, mapping 604 processes the geometry and attribute components identically. This allows the decoder 650 of FIG. 6B to identify the corresponding values to each point without additional information. In certain embodiments, the mapping 604 processes the geometry and attribute components differently. If the mapping 604 processes the geometry and attribute values differently, additional data such as metadata or a look-up table is generated to identify the related geometry and attribute values which are required to be encoded via encoding 608 and 610 respectively. Mapping the geometry and attribute of the point cloud 602 is described in further detail with respect to in FIG. 11B below.

Frame packing 606 packs the XYZ geometry values of the point cloud 602 to support chroma-subsampling schemes such as 4:2:0 rather than 4:4:4 as assumed in the previous descriptions. In certain embodiments, the geometry values X, Y, and Z indicate positions of the points in a 3-D space that are packed to support a predetermined chroma subsampling. For example, the points in the 3-D space are packed to support a chroma subsampling of 4:2:0 when the projected geometry values are encoded by encoding 608. Example frame packing are discussed with reference to FIGS. 12A-C below.

In certain embodiments, frame packing 606 is omitted from the encoder 600 when the mapping 604 stores the geometry frame in 4:4:4 format. That is, the geometry values X, Y, and Z are sent to encoding 608 from mapping 604. Then the geometry values are compressed using a video encoder. For instance, the geometry values can be compressed via HEVC encoding.

The encoder 600 sends the R, G, and B color components to the encoding 610. In certain embodiments, the RGB color values are compressed by encoding 610 using a video encoder. In certain embodiments, other encoders can be used. In certain embodiments, a frame packing step similar to the frame packing 606 can be used with the geometry values of R, G, and B.

The multiplexer 612 combines the X, Y, and Z geometry components (coordinates) and the R, G, and B color components into a single bitstream 614. In certain embodiments, the XYZ and the RGB components of the point cloud mapped to 2D are multiplexed with additional audio and video tracks.

Encoder 600 can indicate locations within the 2-D mapped geometry and attribute frames where the point cloud data exists. Other locations within the 2-D frames that do not contain valid point cloud data are filled with zero or another default value.

In certain embodiments, encoder 600 can indicate the absence of the point cloud data in the 2-D mapped frames. For instance, the three components of a geometry video are 0, 0, and 0, at any location with no mapping data. In certain embodiments, encoder 600 can generate a syntax to indicate the absence of the point cloud data in the 2-D mapped frames. In certain embodiments, the syntax is similar to the auxiliary information 558 of FIG. 5B. The syntax can be transmitted with the bitstream 614. The syntax can include a pixel value that is used to signal the absence of point cloud data at any pixel location in the 2-D frame.

In certain embodiments, by generating metadata by the mapping 604 the encoder 600 can indicate the type of video track in the bitstream, whether it is normal 2-D video track, a geometry video track of a point cloud, or an attribute video track of a point cloud. For example, the type of video track can be identified by the syntax: unsigned char pc_track_type. The integer 0 can be used to indicate that the information is a normal 2-D video track and not a point cloud track. The integer 1 can be used to indicate a point cloud geometry video track. The integer 2 can be used to indicate a point cloud attribute video track such as color. The integer 3 can be used to indicate another point cloud attribute video track such as normal. Additional integers can be used to indicate additional attributes. In certain embodiments, of the above syntax, an integer that indicates the geometry video track is lower than any integer that indicates an attribute video track. For example, an integer that indicates a geometry track is a lower number than an integer that indicates a color attribute track. Therefore, in this example when the bitstream 614 is received by the decoder 650, any frame that is received with a syntax integer other than 0 and an integer that indicates geometry, is identified as an attribute type.

Figure 6C:
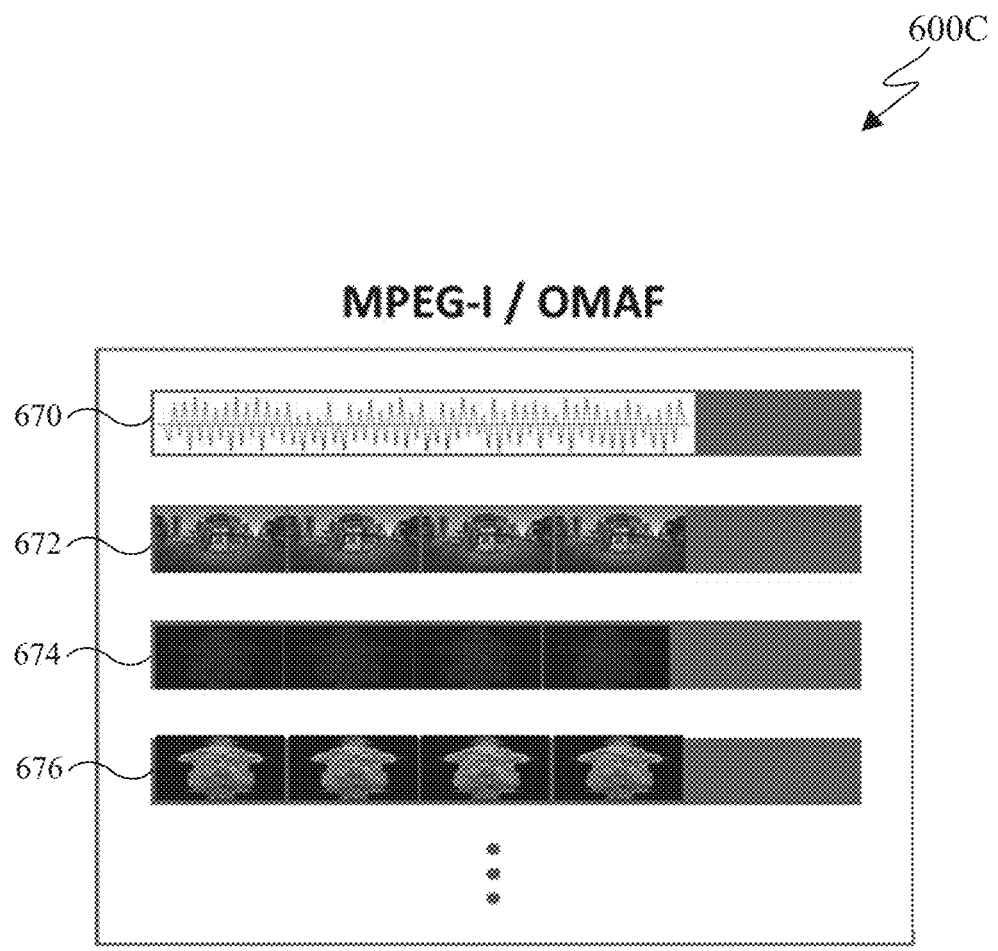
FIG. 6C illustrates an 2-D mapping of a point cloud using multiple video tracks in accordance with an embodiment of this disclosure.

For example, FIG. 6C illustrates the 2-D mapping of a point cloud using multiple video tracks in accordance with an embodiment of this disclosure. Environment 600C of FIG. 6C illustrates a MPEG video with multiple tracks. In particular, the generated metadata by the mapping 604 the encoder 600 can indicate the type of video track in the bitstream. For example, track 670 illustrates an audio track, and tracks 672, 674, and 676 illustrates video tracks. For instance, track 672 is a 360° video, track 674 is the XYZ geometry of the point cloud, and track 676 illustrates the color attribute of the point cloud. Additional tracks can be added for each additional attribute. For example, track 672 can include the integer 0 to indicate that the information is a normal 2-D video track and not a point cloud track. Similarly, track 674 can include the integer 1 to indicate a point cloud geometry video track. Similarly, the track 676 can include the integer 2 to indicate a point cloud attribute video track such as color.

In certain embodiments, by generating metadata by the mapping 604 the encoder 600 can indicate a composite of different point clouds or a composite of point cloud(s) and a 2-D video. A 2-D video could be a normal 2-D video of the front view or a video of 360-degree view. For example, a scene is a composite of one or more multiple foreground point cloud(s) with a background point cloud. For example, the syntax of unsigned short int pc_pos_offset_X can be used to indicate the X position offset of the point cloud object within the background point cloud or 2-D video. In another example, the syntax of unsigned short int pc_pos_offset_Y can be used to indicate the Y position offset of the point cloud object within the background video. In another example, the syntax of unsigned short int pc_pos_offset_Z can be used to indicate the Z position offset of the point cloud object within the background video. In another example, the syntax of unsigned short int pc_rot_X can be used to indicate the initial pitch angle of a foreground point cloud. In another example, the syntax of unsigned short int pc_rot_Y can be used to indicate the initial yaw angle of a foreground point cloud. In another example, the syntax of unsigned short int pc_rot_Z can be used to indicate the initial roll angle of a foreground point cloud. In another example, the syntax of unsigned short int pc_scale can be used to indicate the scale of a foreground point cloud. In another example, the syntax of unsigned char pc_alpha can be used to indicate the transparency value of a foreground point cloud. In another example, the syntax of unsigned int pc_time_offset can be used to indicate the time offset of a point cloud with respect to the background video. In another example, the frame rate of each point cloud and that of the background video can be different. For instance, a point cloud object can have a frame rate of 10 Frames Per Second (FPS) and the background video can have a frame rate of 60 FPS. In certain embodiments, if the background video does not contain depth information, the point cloud tracks are composited on top the background video.

Decoder 650 extracts the geometry and attribute bitstreams from the bitstream 614 by demultiplexer 652. The geometry bitstream are decoded by decoding 654. Similarly, the attribute bitstream are decoded by decoding 656. In certain embodiments, the decoding 654 is a 10+-bit video decoder. In certain embodiments, the decoding 656 is an 8-bit video decoder.

In certain embodiments, decoding 654 can be lossless or lossy. Similarly, in certain embodiments, decoding 656 can be lossless or lossy. For example, lossless or lossy decoding is dependent on a 2-D mapping scheme and the quantization parameters of the engaged 2-D video encoders such as encoding 608 and 610 from the encoder 600. If encoding 608 or 610 is a lossy encoder, then the number and locations of the points in the two generated videos may not be matched. In one embodiment, if the encoder is lossy, the encoder generates a binary mask (also known as alpha mask or occupancy map) and add it to the output bitstream 614 either uncompressed or using lossless compression.

Frame unpacking 658 unpacks the geometry values as packed by frame packing 606 of the encoder 600. Renderer 660 renders the point cloud 662 by mapping the attribute values onto the 3-D space based on the geometry values. For example, renderer 660 extracts the geometry values X, Y, and Z as well as the attribute values, R, G, and B to renders the point cloud 662. If a binary mask is available in bitstream 614, renderer 660 uses it to find the location of valid points in the decoded geometry and attribute frames. In one embodiment, if encoder 600 encodes the geometry or one of attribute videos using lossless compression, and if the geometry and attributes are all stored at identical locations in the 2-D videos, then encoder 600 may not store a binary mask in bitstream 614. In such a case, the render 660 can use the location of valid pixels in one of the lossless 2-D videos to indicate the valid pixels in the lossy 2-D videos.

Figure 7A:
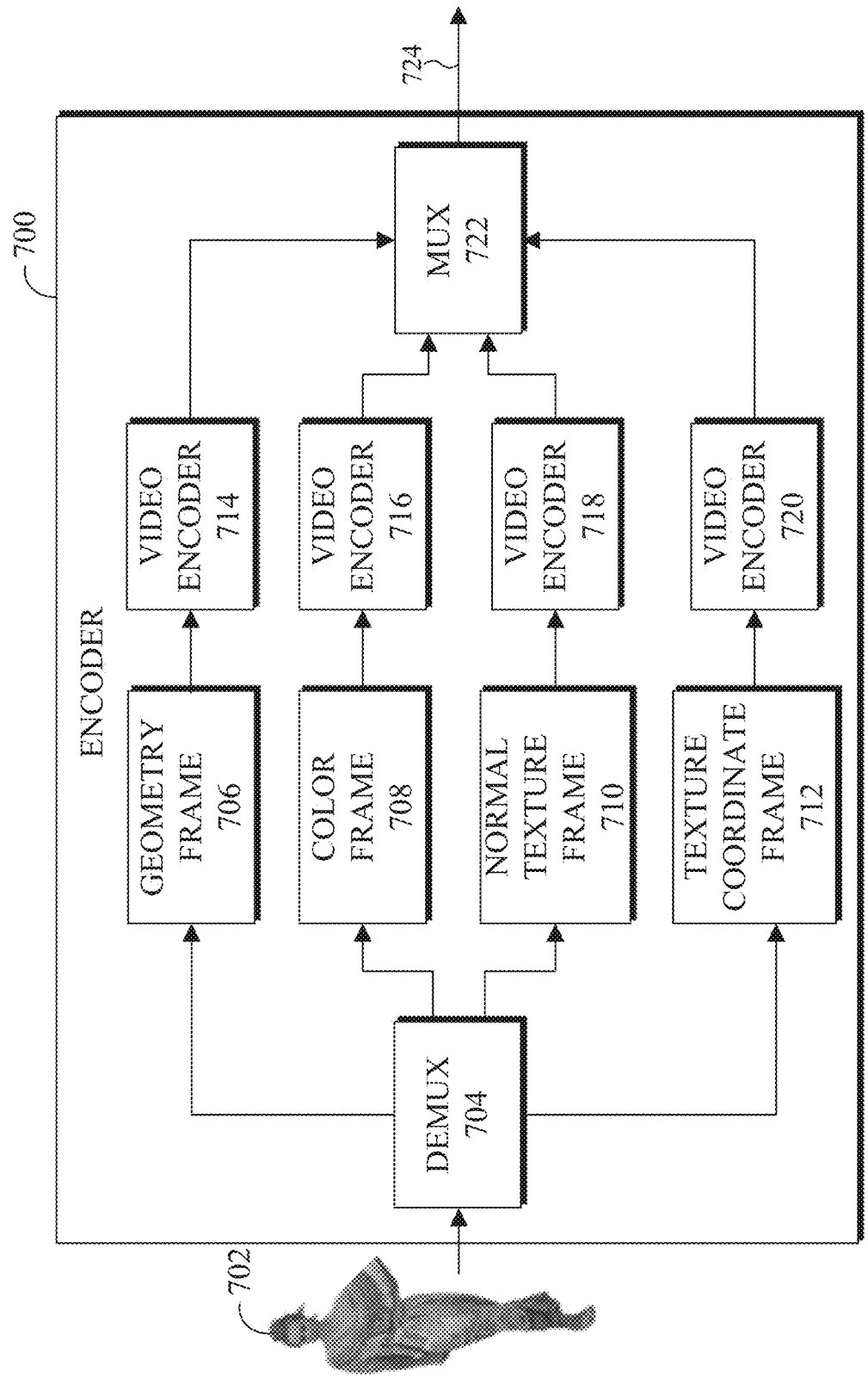
FIG. 7A illustrates an example block diagram of an encoder in accordance with an embodiment of this disclosure.
Figure 7B:
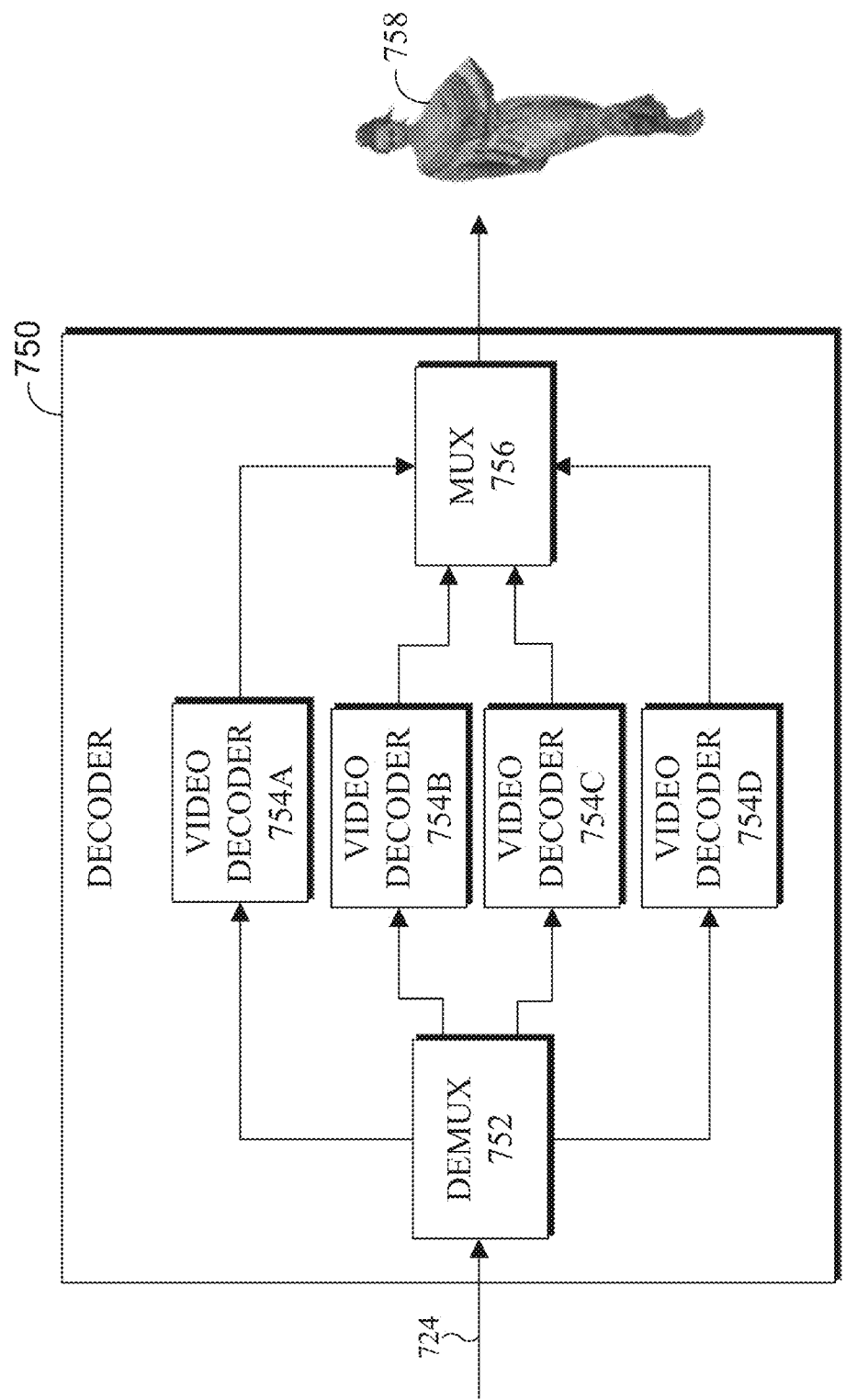
FIG. 7B illustrates an example block diagram of a decoder in accordance with an embodiment of this disclosure.

FIG. 7A illustrates encoder 700. Encoder 700 illustrates a high-level overview of an embodiment of the present disclosure of an electronic device that encodes and compresses a point cloud for transmission. Encoder 700 is similar to encoder 500 of FIG. 5A and encoder 600 of FIG. 6A. Encoder 700 includes a demultiplexer 704, a number of frames with a respective video encoder and a multiplexer 722. The frames include a geometry frame 706, a color frame 708, a normal texture frame 710, and a texture coordinate frame. Each frame is associated with an individual video encoder 714-720. The point cloud 702 is the input into the encoder 700 and bitstream 724 is the output. Similarly FIG. 7B illustrates decoder 750. Decoder 750 is similar to decoder 550 of FIG. 5B and decoder 650 of FIG. 6B. Decoder 750 illustrates a high-level overview of an embodiment of the present disclosure of an electronic device that decodes the compressed point cloud of the encoder 700. Decoder 750 includes a demultiplexer 752, video decoders 754A-D and a multiplexer. The input is the same or similar bitstream 724 from encoder 700 and the output is the generated point cloud 758.

In certain embodiments, point cloud 702, the point cloud 602 of FIG. 6A and the point cloud 502 of FIG. 5A are the same. In certain embodiments, each point of the point cloud 702 can be represented by a single equation that indicates each attribute and the geometric location of the point within the point cloud. For example, the following equation can be used:

$$P_n = X_n, Y_n, Z_n, R_n, B_n, G_n, NX_n, NY_n, NZ_n, U_n, V_n \qquad \text{Equation:}$$

In the above equation, n is an integer starting at 1. In the above equation $(X_n, Y_n, Z_n)$ are the X, Y, and Z coordinates of a single point n in 3-D space. In the above equation $(R_n, B_n, G_n)$ are the color of the point n in 3-D space. In the above equation $(NX_n, NY_n, NZ_n)$ is the normal for the point n in 3-D space. In the above equation $(U_n, V_n)$ are the texture coordinates of the point n. In certain embodiments, of the above equation, a point n can have a subset of attributes. In certain embodiments, of the above equation, a point n can have additional attributes such as material properties, intensity, quality, flags, and the like.

Demultiplexer 704 is similar to the mapping 604 of FIG. 6A and the decompose point cloud 504 of FIG. 5A. In certain embodiments, demultiplexer 704 the mapping 604 of FIG. 6A and the decompose point cloud 504 of FIG. 5A are the same. Demultiplexer 704 analyzes the point cloud 702 and decomposes the point cloud into various components. Based on the above equation the demultiplexer 704 can separate out the various variables for each point n in the point cloud 702. For example, the demultiplexer 704 extracts the geometry attributes $(X_n, Y_n, Z_n)$ and the geometry attributes are mapped into geometry frame 706. Similarly, the demultiplexer 704 extracts the color attributes $(R_n, B_n, G_n)$ and the color attributes are mapped into color frame 708. Similarly, the demultiplexer 704 extracts the normal attributes $(NX_n, NY_n, NZ_n)$ and the normal attributes are mapped into normal texture frame 710. Similarly, the demultiplexer 704 extracts the texture coordinate attributes $(U_n, V_n)$ and the texture coordinate attributes are mapped into texture coordinate frame 712.

Each frame 706-712 maps a different attribute of the point cloud 702 into a video frame. For example, frames 706-712 illustrate four mappings that correspond to storing eleven different attribute components in the four video frames that of the geometry frame 706, the color frame 708, the normal texture frame 710, and the texture coordinate frame 712. In certain embodiments, each frame 706-712 can be the same size, each frame 706-712 can be different sizes, or a portion of the frames 706-712 can be the same size while other frames are different sizes. For example, the geometry frame 706 can have the width of W and a height of H.

The geometry frame 706 represents a 2-D video picture containing the geometric attributes of the point cloud 702. The video encoder 714 receives the 2-D video picture containing the geometric attributes and compresses the video of the geometric attributes. Similarly, the color frame 708 represents a 2-D video picture containing the color attributes of the point cloud 702. The video encoder 716 receives the 2-D video picture containing the color attributes and compresses the video of the color attributes. Similarly, the normal texture frame 710 represents a 2-D video picture containing the normal attributes of the point cloud 702. The video encoder 718 receives the 2-D video picture containing the normal attributes and compresses the video of the normal attributes. Similarly, the texture coordinate frame 712 represents a 2-D video picture containing the texture coordinates of the point cloud 702. The video encoder 720 receives the 2-D video picture containing the texture coordinates and compresses the video of the texture coordinates attributes. The multiplexer 722 combines the individually compressed frames to generate a bitstream 724.

The decoder 750 extracts the geometry and attribute values from the bitstream 724 by demultiplexer 752. The demultiplexer 752 splits the bitstream 724 into the four compressed frames. The compressed video of the geometry attributes are decoded by video decoder 754A. The compressed video of the color attributes are decoded by video decoder 754B. The compressed video of the normal attributes are decoded by video decoder 754C. The compressed video of the texture coordinate attributes are decoded by video decoder 754D.

The multiplexer 756 combines the decoded video pictures from video decoder 754A-D. The video decoder 754A sends the video picture of the geometry attributes $(X_n, Y_n, Z_n)$ to the multiplexer 756. The video decoder 754B sends the video picture of the color attributes $(R_n, B_n, G_n)$ to the multiplexer 756. The video decoder 754C sends the video picture of the normal attributes $(NX_n, NY_n, NZ_n)$ to the multiplexer 756. The video decoder 754D sends the video picture of the texture coordinate attributes $(U_n, V_n)$ to the multiplexer 756. Thereafter, the multiplexer 756 generates the point cloud based on $P_n = X_n, Y_n, Z_n, R_n, B_n, G_n, NX_n, NY_n, NZ_n, U_n, V_n$.

Figure 8A:
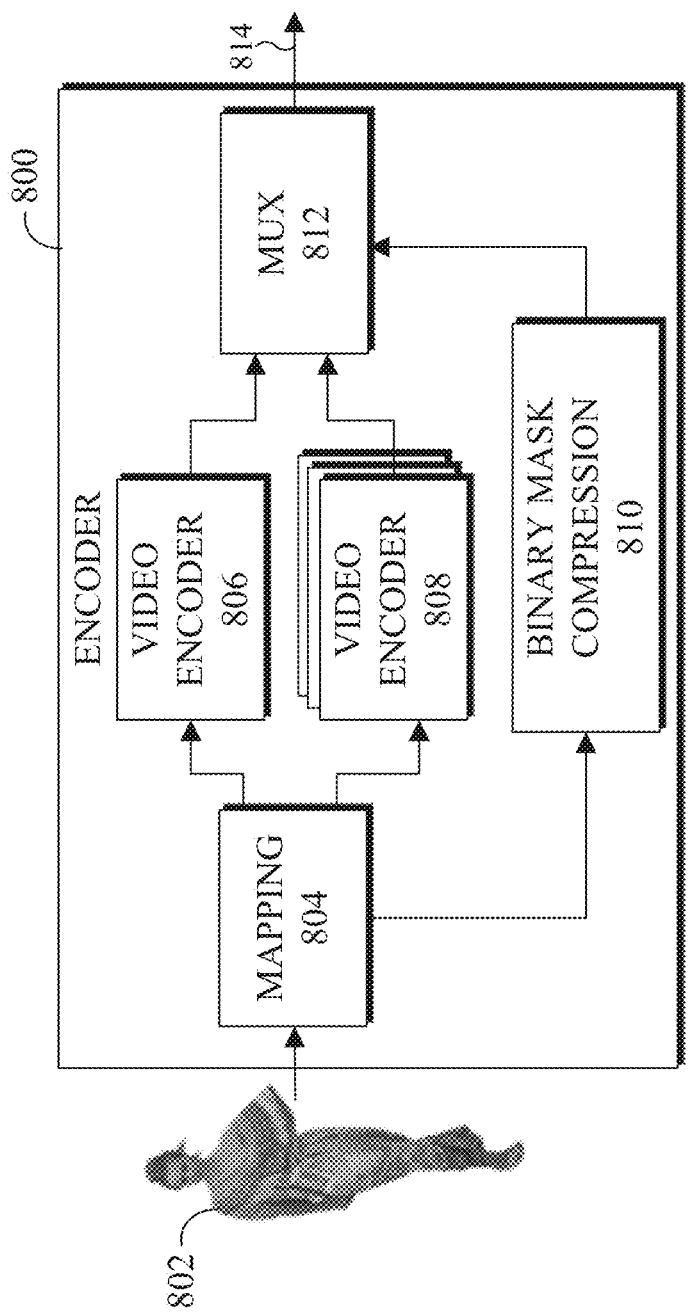
FIG. 8A illustrates an example block diagram of an encoder in accordance with an embodiment of this disclosure.

FIG. 8A illustrates encoder 800. Encoder 800 illustrates a high-level overview of an embodiment of the present disclosure of an electronic device that encodes and compresses a point cloud for transmission. Encoder 800 is similar to encoder 500 of FIG. 5A, encoder 600 of FIG. 6A, and encoder 700 of FIG. 7A. Encoder 800 includes mapping 804, video encoding, 806 and 808, a binary mask compression, 810 and a multiplexer 812. The point cloud 802 is the input into the encoder 800 and bitstream 814 is the output.

Figure 8B:
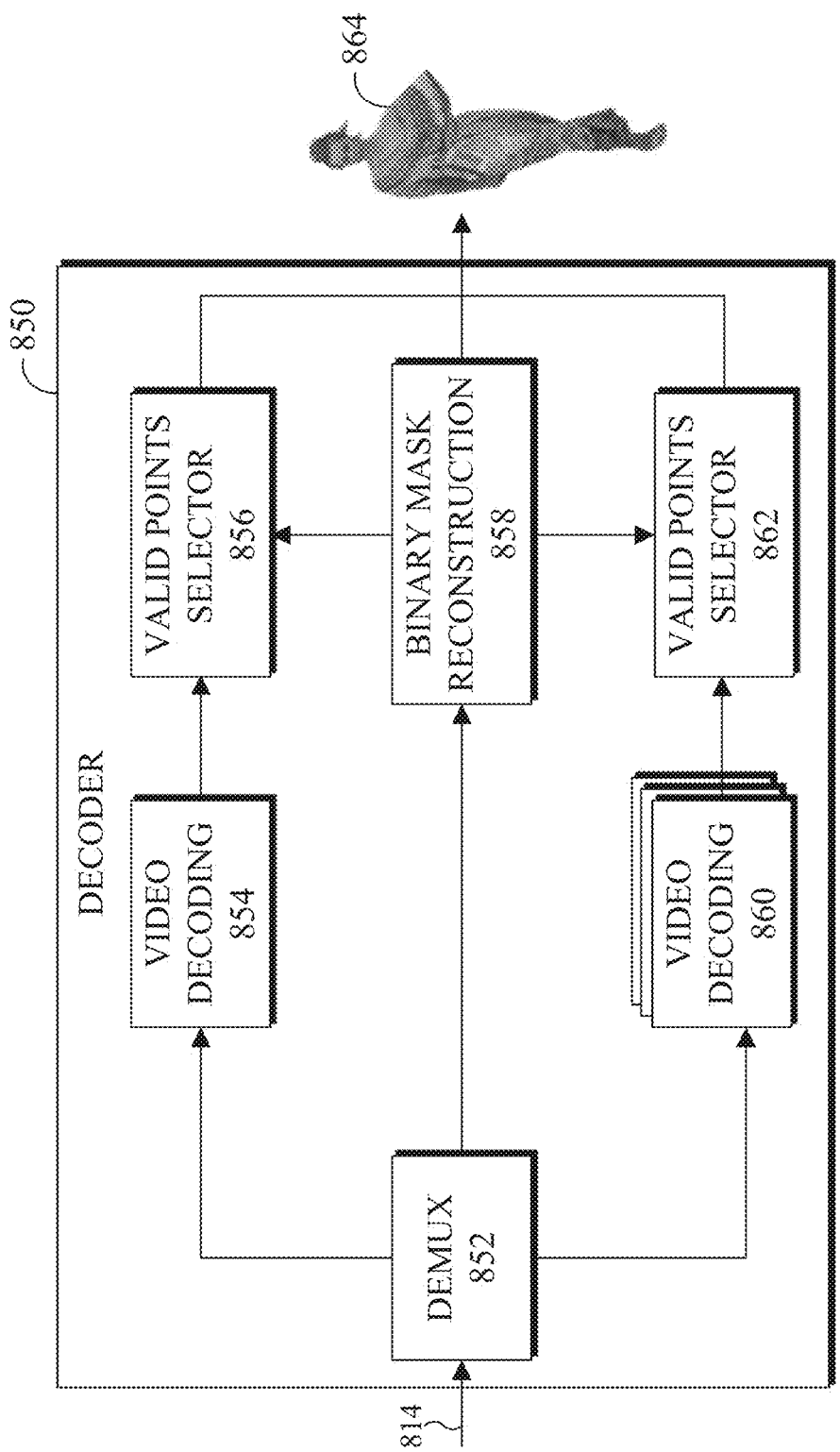
FIG. 8B illustrates an example block diagram of a decoder in accordance with an embodiment of this disclosure.

Similarly FIG. 8B illustrates decoder 850. Decoder 850 is similar to decoder 550 of FIG. 5B, decoder 650 of FIG. 6B, and decoder 750 of FIG. 7B. Decoder 850 illustrates a high-level overview of an embodiment of the present disclosure of an electronic device that decodes the compressed point cloud of the encoder 800. Decoder 850 includes a demultiplexer 852, video decoders 854 and 860, a valid point selector 856 and 862, and a binary mask reconstruction 858. The input is the same or similar bitstream 814 from encoder 800 and the output is the generated point cloud 864.

In certain embodiments, point cloud 802, the point cloud 702 of FIG. 7A, the point cloud 602 of FIG. 6A, the point cloud 502 of FIG. 5A are the same. Mapping 804 maps the point cloud 802 into multiple frames. Each frame is then individually encoded. For example, video encoder 806 encodes the geometry attributes, such as X, Y, and Z. Video encoder 808 represents multiple video encoders, that encode the various attributes such as color, texture, normal and the like. In certain embodiments, the point cloud 802 is subsampled prior to mapping 804 to reduce the data size. In certain embodiments, the frames generated by the mapping 804 can be subsampled to reduce the data size of each frame.

In certain embodiments, if the point cloud 802 is uniformly sparse then the geometry values are downscaled by a predetermined factor in order to move each point closer to each other. By downscaling the density of points is increased. The predetermined downscaling factor can be added to the bitstream as metadata.

In certain embodiments, if the point cloud 802 is non-uniformly sparse, such that there are portions of the point cloud 802 that are denser than other parts, then the geometry values are downscaled regionally by different factors. By regionally downscaling the point cloud 802 by different factors to make the point cloud evenly dense in all regions. The downscaling factors can be added to the bitstream as metadata.

In certain embodiments, the various attributes of the point cloud 802 can be stored in a video frame by using padding or copying the edge pixels of the region used to store the point cloud attributes.

In certain embodiments, the size of each video frame is adaptively modified based on the size and shape of the unfilled space in the video frame. For example, each video frame can have a present initial size. Once the point cloud is projected onto the video frame, the frames can be expanded or reduced to fit the projection. In certain embodiments, the size of each frame is in multiples of eight.

The binary mask compression 810 is similar to the occupancy map generator 512 of FIG. 5A. The binary mask compression 810 compresses a binary image of the frame. In certain embodiments, the mask information generated by the binary mask compression 810 represents the start pixel location number and the end pixel location number for each line of the video frame.

Each encoded video frame and the binary mask is combined by multiplexer 812. The multiplexer 812 generates the compressed bitstream 814.

The decoder 850 extracts the geometry and attribute values from the bitstream 814 by demultiplexer 852. The demultiplexer 852 splits the bitstream 814 into the various compressed frames. The geometry bitstream is decoded by video decoding 854. The various attributes are decoded by video decoding 860. In certain embodiments, video decoding 860 represents multiple video decoders each to decode a particular attribute such as color, texture, normal, and the like.

Demultiplexer 852 also splits the bitstream 814 into the binary mask reconstruction 585. The binary mask reconstruction is the binary mask that indicates valid and invalid points on each frame. The valid point selector 856 analyzes the binary mask and selects valid points of the geometric frame. Similarly, valid point selector 862 analyzes the binary mask and selects valid points of each attribute frame. The decoder 850 then generates a reconstructed point cloud 864.

In certain embodiments, additional mappings and frame generation techniques can be used. For example, the encoder, such as encoder 500, 600, 700, or 800, uses a projection to fill a single video frame continuously with a single point cloud attribute. The encoder then generates and sends metadata along with the bitstream that indicates the type of the attribute stored in the particular video frame. If the size of the frame is larger than the number of points in the point cloud, then the encoder partially fills the frame with the valid attribute data and leaves the unfilled pixels are empty. The empty pixels can be filled with zeros or left as a default value. The decoder, such as decoder 550, 650, 750, or 850, receives the bitstream from the respective encoder. The decoder can use the generated metadata to determine the type of attribute stored in the decoded frame to output the attribute appropriately. Example syntax can include "unsigned char attr_type;" to indicate the attribute type. The example syntax of "unsigned short int attr_num_pts;" can be used to indicate the number of points of the particular attribute. The example syntax of "unsigned short int unfil_val;" can be used to indicate the default value of unfilled pixels within a particular frame.

In another example, the encoder, such as encoder 500, 600, 700, or 800, uses a projection to fill a video frame with point cloud data and sends metadata indicating the type of attribute stored in the particular frame along with the number of valid points. The decoder, such as decoder 550, 650, 750, or 850, receives the bitstream from the respective encoder. The decoder uses the metadata to determine the type of number of attributes stored in the decoded frame in order to output attribute appropriately.

In certain embodiments, it is possible for the number of points in a particular point cloud to exceed the maximum number of pixels that can be stored in a single frame. In this situation, the point cloud attributes can be spread over multiple frames, and metadata can be generated to indicate the attribute or portion of an attribute that is stored in each frame.

Figure 12A:
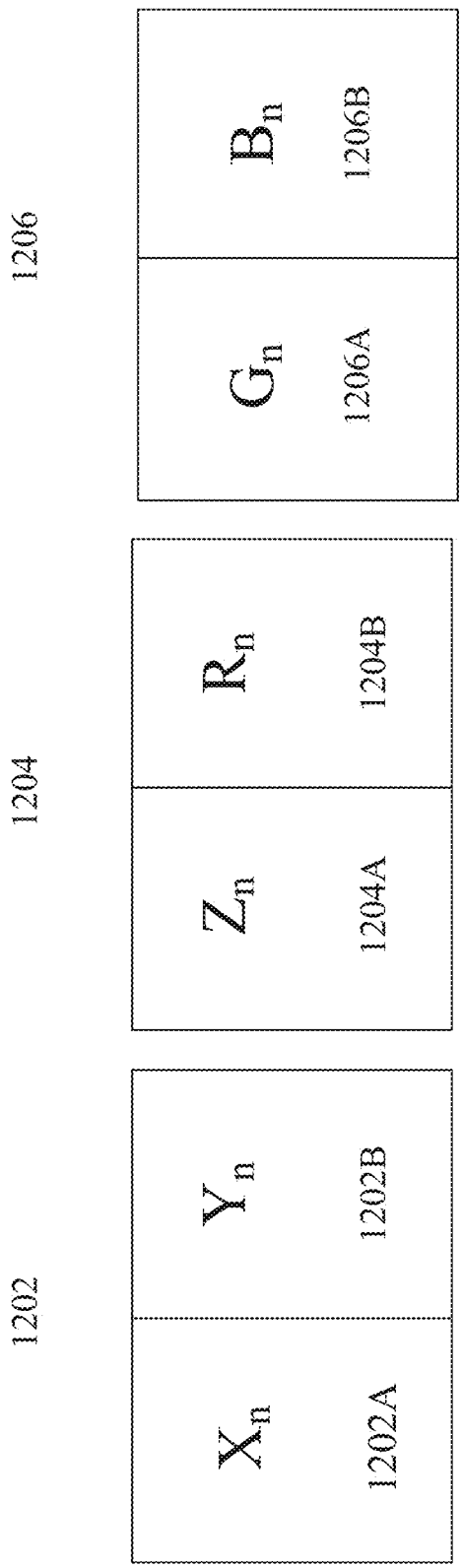
FIGS. 12A-12E illustrate example packing operations in accordance with an embodiment of this disclosure.

In certain embodiments, it is possible for the number of points in a particular point cloud to be less than the total number of pixels in a generated frame. For example, in this situation, the pixels in the unfilled frame that are left empty can be filled with zeros or another default value. In another example, in this situation, the frame can be filled with multiple attributes. FIG. 12A, below illustrates multiple attributes stored in a single video frame. Metadata can be generated to indicate the default values of empty pixels or indicate the multiple attributes that are stored in the frame.

Figure 9:
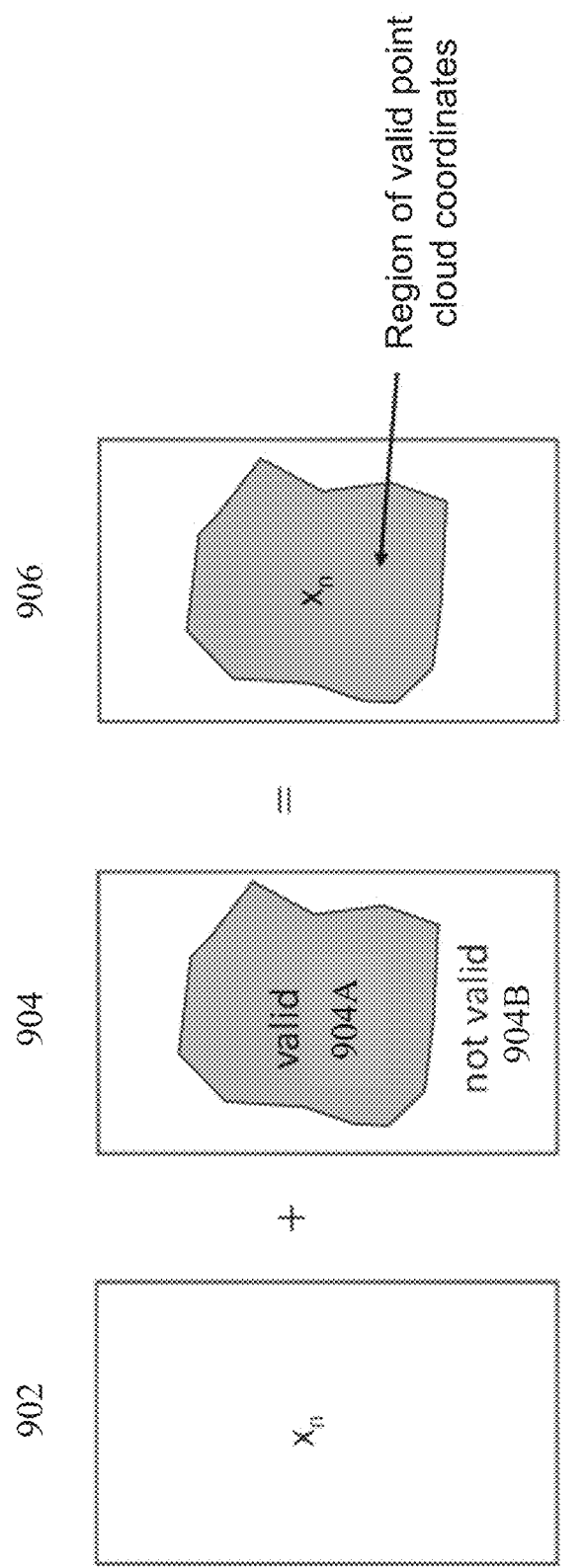
FIG. 9 illustrates an binary mask in accordance with an embodiment of this disclosure.

FIG. 9 illustrates a binary mask in accordance with an embodiment of this disclosure. The embodiment of FIG. 9 is for illustration only and other embodiments could be used without departing from the scope of this disclosure. FIG. 9 illustrates frame 902, frame 904, and frame 906.

Frame 902 illustrates a video frame of the geometric coordinates $X_n$ of a point cloud. Frame 904 represents a binary mask which contains mask 904A that indicates the portion of frame 902 that contains valid geometric coordinates. The invalid area 904B indicates pixels that do not contain any valid point cloud data. Frame 906 indicates frame 902 overlaid with frame 904. The region that contains the point cloud coordinates are the location of valid geometric coordinates of the point cloud. The mask 904A can be applied to all attributes in which the valid data are stored at the same location in the 2-D frames.

In certain embodiments, the binary mask is compressed and transmitted with the bitstream. For example, the binary mask can be compressed to an array of 16-bit integers, where each number is the length of each row.

Figure 10:
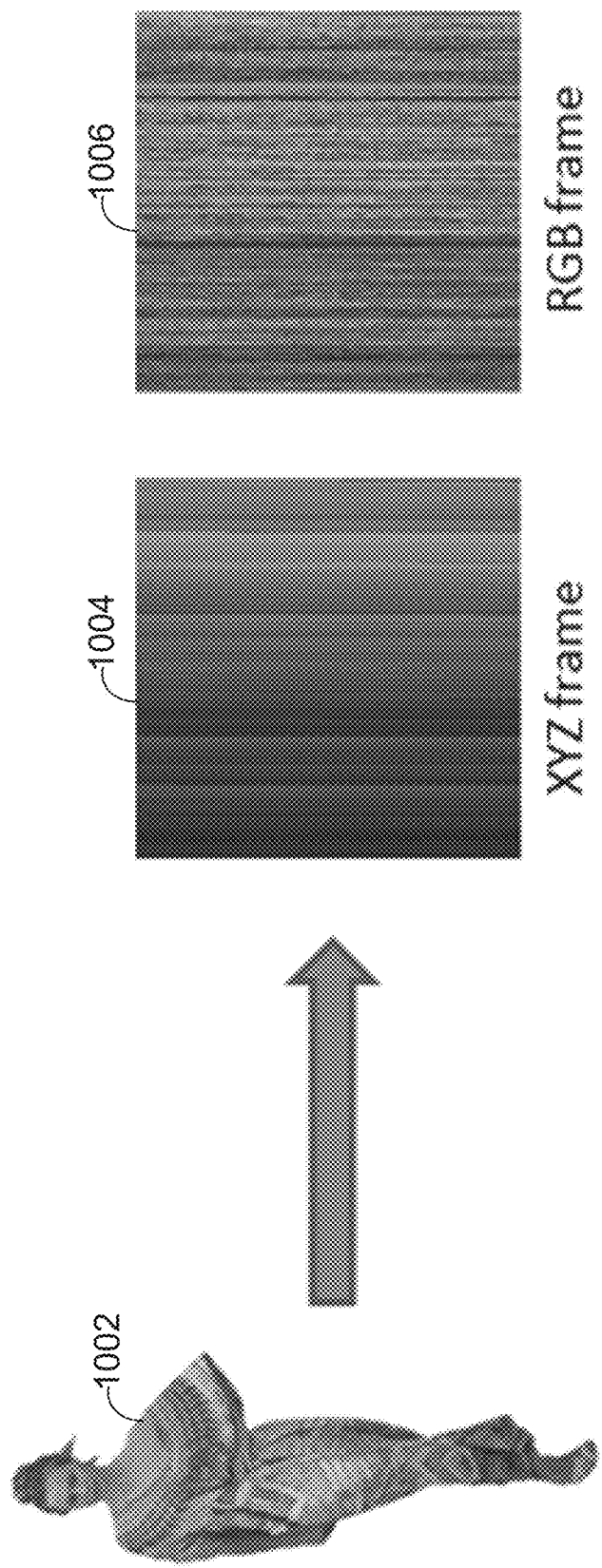
FIG. 10 illustrates an example raster scan in accordance with an embodiment of this disclosure.

FIG. 10 illustrates an example raster scan mapping in accordance with an embodiment of this disclosure. The embodiment of the raster scan according to FIG. 10 is for illustration only and other embodiments could be used without departing from the scope of this disclosure. FIG. 10 illustrates a point cloud 1002, a geometry (XYZ) frame 1004 and a color (RGB) frame 1006. The geometry frame 1004 is the mapping of each X, Y, and Z coordinate of the input point cloud 1002 from the 3-D space to a 2-D plane using a raster scan. The color frame 1006 is the mapping of each R, G, and B color coordinate of the input point cloud 1002 from the 3-D space to a 2-D plane using a raster scan. In the raster scan method, points are read from the point cloud 1002 in the order they are stored in the point cloud 1002. Then each attribute of the input point is mapped to the corresponding 2-D frame line by line. It is noted that point cloud 1002 is similar to the point cloud 502 of FIG. 5A, 602 of FIG. 6A, 702 of FIG. 7A, and 802 of FIG. 8A.

For instance, the geometry frame 706 can be designated as $f_1$, the color frame 708 can be designated as $f_2$, the normal texture frame 710 can be designated as $f_3$, and the texture coordinate frame 712 can be designated as $f_4$. The four frames can then be identified by $f_1(i, j, k)$, $f_2(i, j, k)$, $f_3(i, j, k)$, and $f_4(i, j, k)$. Each mapped frame can have one, two, or three components in each respective video encoder 714-720. For example, variable k can represent the different components of f(i, j, k). For instance, if the there are three components the frame is f(i, j, 0), f(i, j, 1), and f(i, j, 2). If there are two components the frame is f(i, j, 0) and f(i, j, 1). If there is one component the frame is f(i, j, 0), or simply f(i, j). For example, if the four mappings are indicated by $M_1( )$, $M_2( )$, $M_3( )$, and $M_4( )$ the following equation can define the mapping:

$$M_1(n)=M_2(n)=M_3(n)=M_4(n)=(n/w, n\%w)$$ Equation:

Based on the above equation, a raster scan can yield the following equations that define each frame:

$$f_1(j,k,0)=x_n, j=n/w, k=n\%w$$

$$f_1(j,k,1)=y_n, j=n/w, k=n\%w$$

$$f_1(j,k,2)=z_n, j=n/w, k=n\%w$$

$$f_2(j,k,0)=r_n, j=n/w, k=n\%w$$

$$f_2(j,k,1)=g_n, j=n/w, k=n\%w$$

$$f_2(j,k,2)=b_n, j=n/w, k=n\%w$$

$$f_3(j,k,0)=nx_n, j=n/w, k=n\%w$$

$$f_3(j,k,1)=ny_n, j=n/w, k=n\%w$$

$$f_3(j,k,2)=ny_n, j=n/w, k=n\%w$$

$$f_4(j,k,0)=u_n, j=n/w, k=n\%w$$

$$f_4(j,k,1)=v_n, j=n/w, k=n\%w$$

$$f_4(j,k,2)=0$$ Equations:

Based on the above equations, for the n-th point of a point cloud, the geometry components $(X_n, Y_n, Z_n)$ and an attribute component, such as color $(R_n, G_n, B_n)$ can be mapped onto individual frames. For example, geometry components can be mapped onto a G frame and the color components can be mapped onto a C frame. The projection of n-th point of the geometry frame is illustrated in frame 1004 as (i) G(n/w, n % w, 0)=Xn; (ii) G(n/w, n % w, 1)=Yn; and (iii) G(n/w, n % w, 2)=Zn. Similarly, the projection of n-th point of the color frame is illustrated in frame 1006 as (i) C(n/w, n % w, 0)=Rn; (ii) C(n/w, n % w, 1)=Gn; and (iii) C(n/w, n % w, 2)=Bn.

Figure 11B:
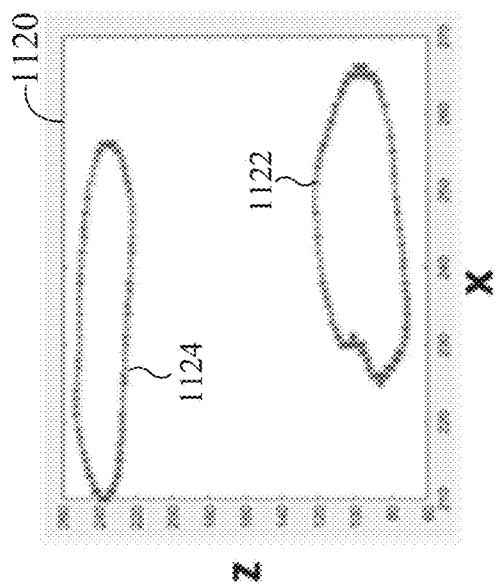
FIGS. 11A-11C illustrate an example of row-wise unwrapping in accordance with an embodiment of this disclosure.
Figure 11A:
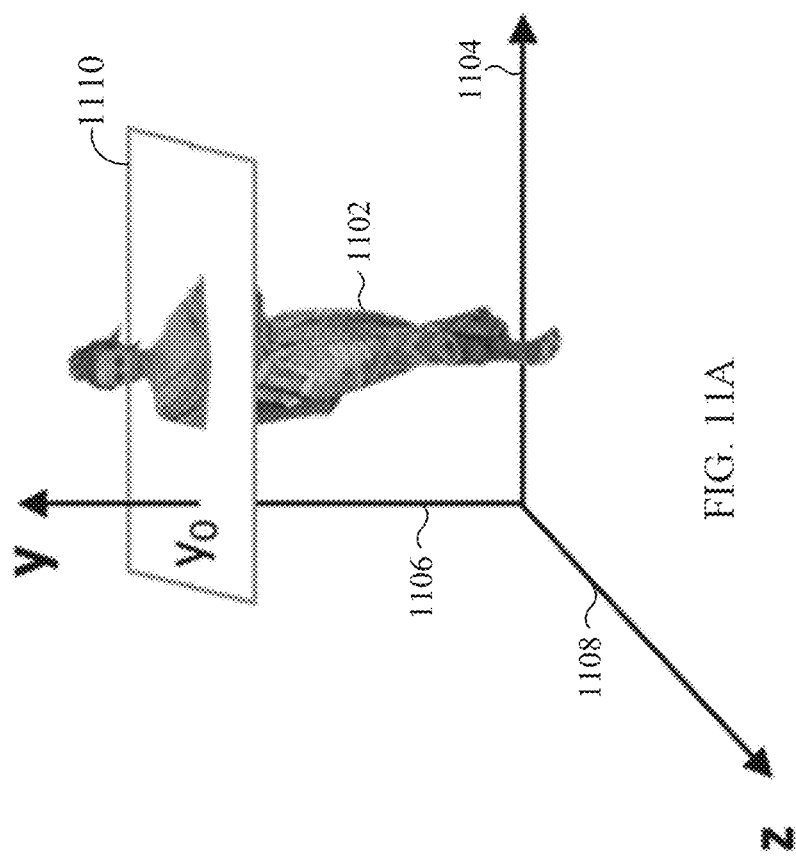
Figure 11C:
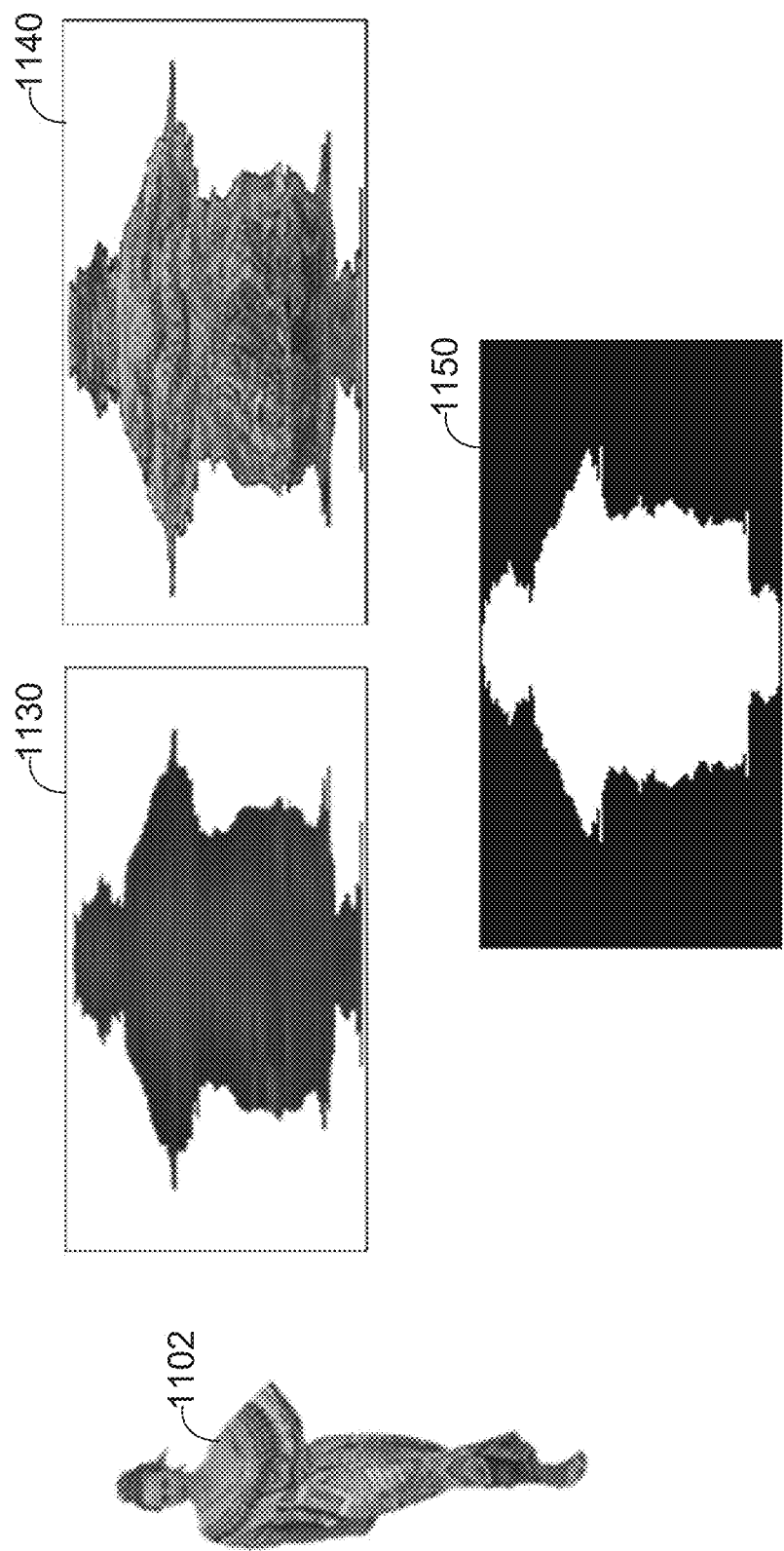

FIGS. 11A, 11B, and 11C illustrate an example of row-wise unwrapping in accordance with an embodiment of this disclosure. FIG. 11A illustrates a point cloud 1102 located on a Cartesian coordinate system. FIG. 11B illustrates cross sections of a point cloud that is mapped in two dimensions. In particular, FIG. 11B illustrates a cross section of a point cloud in the XZ plane for a particular Y value. FIG. 11C illustrates the mapping of a point cloud onto individual frames. The embodiment of the row-wise unwrapping according to FIGS. 11A-C are for illustration only and other embodiments could be used without departing from the scope of this disclosure.

FIG. 11A illustrates a point cloud 1102 located on a Cartesian coordinate system of the X-axis 1104, the Y-axis 1106 and the Z-axis 1108. The point cloud 1102 is similar to the point cloud 502 of FIG. 5A, 602 of FIG. 6A, 702 of FIG. 7A, 802 of FIG. 8A, and 1002 of FIG. 10. Plane 1110 scans the point cloud 1102 along with a single axis. As illustrated plane 1110 scans the point cloud 1102 along the Y-axis 1106. In certain embodiments, plane 1110 can scan the point cloud 1102 along the X-axis 1104 or the Z axis 1108. For example, the point cloud 1102 is scanned along the Y axis 1106 to find the X and Z points along the X-axis 1104 and the Z axis 1108, respectively. In certain embodiments, the point cloud 1102 is scanned along the longest axis. In certain embodiments, the encoder 500, 600, 700, or 800 can determine the longest axis and scan along that axis. In certain embodiments, the encoder 500, 600, 700, or 800 scans the point cloud 1102 along with a predetermined axis regardless of the size or shape of the point cloud 1102.

FIG. 11B illustrates a graph 1120 that depicts a cross-section of the point cloud 1102 in the XZ plane for a particular Y plane. Then, the X and Z values of the cross-section points are stored in the y-th rows of the first and second components of one frame of a video (or one image). Similarly, the R, G, and B color components of the cross-section points are written in the y-th rows of the first, second, and third components of one frame of another video. Every other or additional point cloud attribute can also be stored either in one frame of a separated video or in a different row of the same video used for other attributes.

In certain embodiments, the cross section points can be sorted and reordered. For example, sorting techniques such as a raster scan (as discussed with reference to FIG. 10) a zig-zag sorting, a depth-first search (DFS), a breath-first search (BFS), and the like can be utilized to sort and reorder the cross section points. Sorting the cross section points such as 1122 or 1124 can increase efficiency when the mapped point cloud is transmitted. In certain embodiments, sorting is applied to different connected components of the cross section image separately.

FIG. 11C illustrates the mapping of a point cloud 1102 onto individual frames such as the geometry frame 1130, the color frame 1140, and a binary mask frame 1150. The geometry frame 1130 illustrates the entirety of the point cloud 1102 that is scanned along the Y axis 1106. The geometry frame 1130 illustrates the entirety of the cross section points such as 1122 and 1124 along the entirety of the Y axis 1106. For example, as the plane 1110 moves along the Y axis 1106, multiple graphs similar to graph 1120 are generated and mapped to video frames line by line to create geometry frame 1130. The geometry frame 1130 illustrates the X and Z points of the point cloud 1102 mapped along the Y axis 1106. Similarly, the color frame 1140 represents the colors R, G, B that correspond to each point of the geometry frame 1130. Binary mask frame 1150 illustrates the valid and invalid pixels of the point cloud. The binary mask frame 1150 is similar to the binary mask of FIG. 9. The binary mask frame 1150 indicates each invalid pixel to allow a decoder to correctly reconstruct and generate the point cloud. In certain embodiments, additional frames are generated to indicate different attributes such as texture, normal, texture coordinates, and the like.

An example syntax is provided below to illustrate the mapping of the point cloud 1102 into the graph 1120 for a single cross section location and the geometry frame 1130, the color frame 1140 and the binary mask frame 1150 along the entirety of a single axis. The example syntax below is described with respect to the longest dimension of the point cloud 1102 which is the Y axis 1106.

```
Syntax:
  Geo = memset(width,height);
  Col = memset(width,height);.
  [X,Y,Z,R,G,B,...] = read_PC(file_name);
  for ( i = 0 to max(Y) )
  {
       [X0,Z0,R0,G0,B0, ...] = get_Cross_Sec_Im(i);
       [X1,Z1,R1,G1,B1,....] = sort(X0,Z0,R0,G0,B0,...);
       Geo(i,:,1) = X1; Geo(i,:,2) = Z1;
       Col(i,:,1) = R1; Col(i,:,2) = G1; Col(i,:,3) = B1;
       ...
  }
```

In the above example, the syntax illustrates mapping a point cloud along the longest dimension. The Geo=memset (width,height) assigns memory for the geometry frame. Similarly, the Col=memset(width,height) assigns memory for the geometry frame. The [X, Y, Z, R, G, B, . . . ]=read_PC(file_name) reads a particular point cloud, such as point cloud 1102, from a particular file. The syntax for (i=0 to max(Y)) provides instructions to scan the point cloud along the axis from a starting at a point and ending at a maximum point. The [X0, Z0, R0, G0, B0, . . . ]=get_Cross_Sec_Im(i) provides instructions to the get cross-section points in the XZ plane for Y=i. The [X1, Z1, R1, G1, B1, . . . ]=sort(X0, Z0, R0, G0, B0, . . . ); is an optional step that applies a sorting algorithm to each row of the scan. The Geo(i,:,1)=X1; Geo(i,:,2)=Z1 provides instructions to write data into one row of the geometry image. The Col(i,:,1)=R1; Col(i,:,2)=G1; Col(i,:,3)=B1 provides instructions to write data into i-th row of color image. Similar syntax is applied for each additional attribute.

In the above syntax the geometry component only stores two components, the X and the Z values while the Y value of each point is implicitly encoded as the row index. This approach of mapping each cross section to one video line may result in projected video frames with large widths for some point clouds. In one embodiment, a smaller width can be utilized for a projected video by splitting the long rows into multiple rows. When long rows are split into multiple rows, the Y values can be written in one component of the projected video.

Figure 12B:
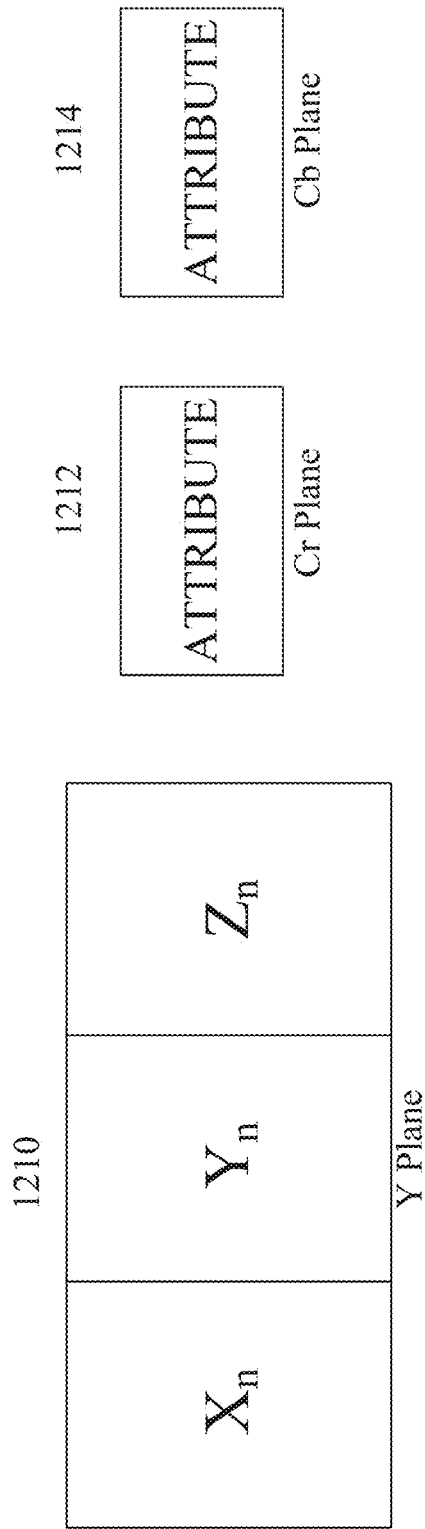
Figure 12C:
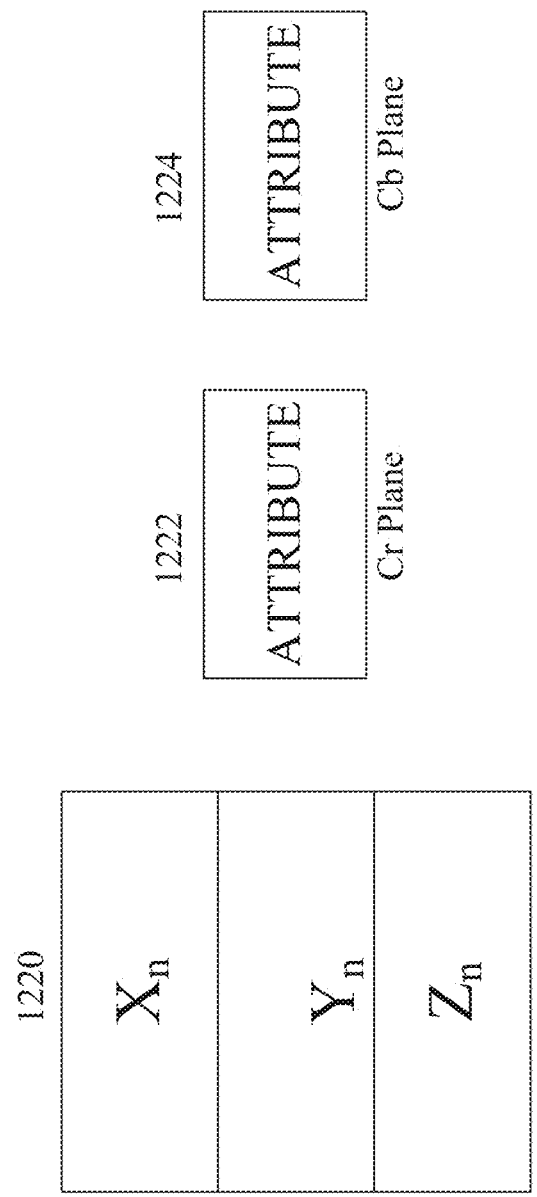
Figure 12D:
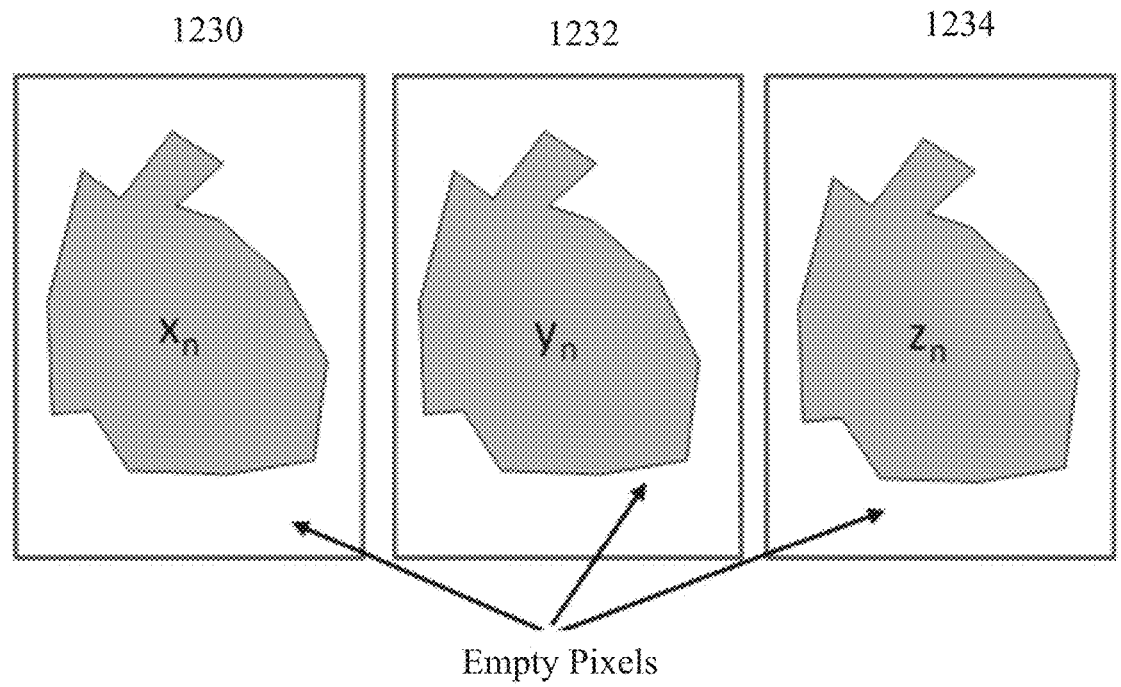
Figure 12E:
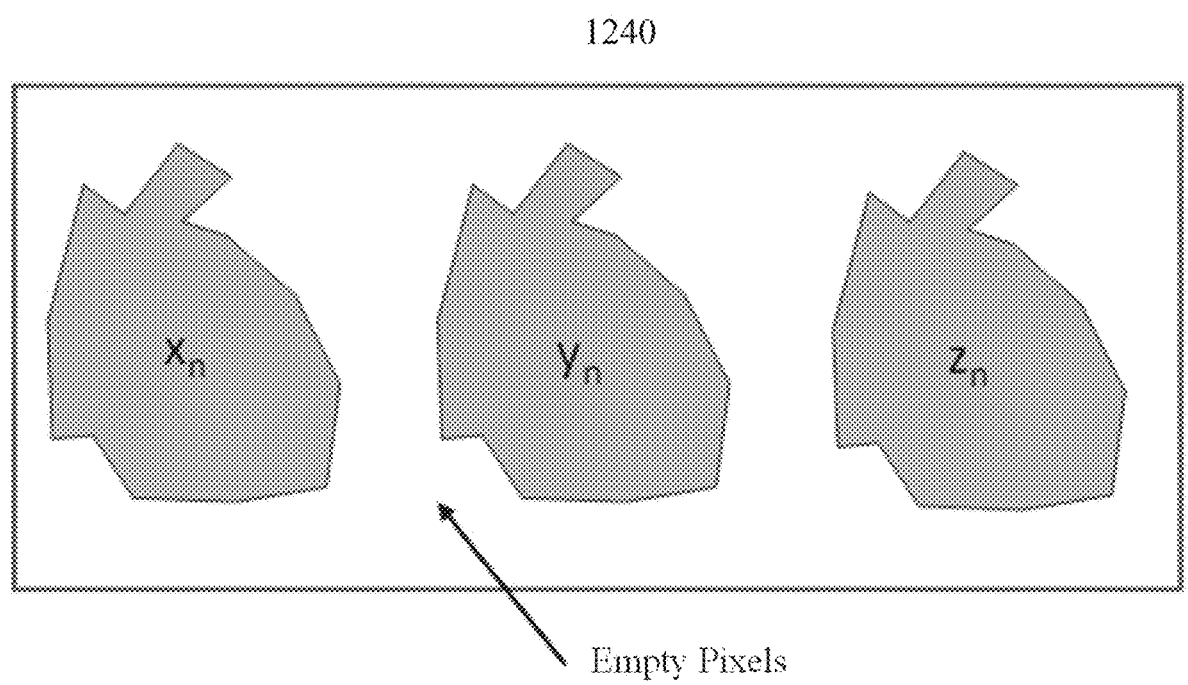

FIGS. 12A-12E illustrates example packing operations in accordance with an embodiment of this disclosure. In particular FIG. 12A illustrates multiple attributes stored in individual frame components. FIGS. 12B and 12C illustrate an example of packing XYZ geometry components of a point cloud frame. FIGS. 12D and 12E illustrate example frames with attributes stored in irregular regions. The embodiment of the various frame packing according to FIGS. 12A-E are for illustration only and other embodiments could be used without departing from the scope of this disclosure.

FIG. 12A illustrates multiple attribute components stored in individual frame components. For instance, the first video component 1202 (i.e. luma Y) of a single video frame stores $X_n$ and $Y_n$ geometry components. Similarly, the second component 1204 (i.e. chroma Cr) stores $Z_n$ and $R_n$ components. Similarly, the third video component 1206 (i.e. chroma Cb) stores $G_n$ and $B_n$ components. In certain embodiments, various components of the geometry and other point cloud attributes can be stored in three component of the same video frame.

FIGS. 12B and 12C illustrate an example of packing all XYZ geometry components of a point cloud frame into the luma component of a 2-D video frame 1210, and 1220 and fill the two chroma component frames 1212, 1214, 1222, and 1224 with 0, another default value, or another attribute's mapping data to support 4:2:0, 4:1:1 or other chroma sub-sampling formats in which the chroma components are subsampled. For example, chroma components frames 1212, 1214, or chroma components frames 1222, 1224 can include an attribute or a default value such as zero. In FIG. 12B the XYZ components are packed horizontally, whereas in FIG. 12C the XYZ components are packed vertically.

FIGS. 12D and 12E illustrate the attributes stored in irregular regions which could be the same for all video frames or different for some of the video frames. FIG. 12D illustrates individual geometry components mapped onto individual 2-D frame components such as frames 1230, 1232, and 1234. In certain embodiments, frames 1230, 1232, and 1234 illustrate multiple video frames or multiple components of the same video frame. FIG. 12E illustrates an individual geometry attributes mapped onto a single 2-D frame component such as 1240. In certain embodiments, a binary mask is used to indicate locations of valid points. A binary mask can indicate that the gray pixels of frame 1240 are valid pixels whereas white pixels of frame 1240 are invalid pixels.

In certain embodiments, the RGB color attribute can be converted from RGB to YCbCr, YCoCg, or other video formats prior to encoding. When the decoder, such as decoder 550, 650, 750, or 850, decodes the frame containing the color attribute, the decoder can convert the various color formats back into the RGB format.

As described above, FIGS. 11A, 11B, and 11C illustrate how geometry and attributes can be stored in three components of a single video frame. For example, geometry frame 1130 illustrates two component's, that of X and Y that are stored in a single frame. Color frame 1140 illustrates three component's, that of R, G, and B that are stored in a single frame. Similarly, multiple attributes can be stored in a single frame, such as the frames of FIGS. 12A, 12B, 12C, and 12E. For example, a particular frame can be designated into multiple regions that are separated by a bounding box. A bounding box is a box that is defined by the top left pixel and width and height of the bounding box. The top left pixel indicates where in the frame the second region starts and is measured by the height and width of the bounding box. The example syntax below can be used to indicate a bounding box when multiple attributes are positioned in a single frame. The syntax of unsigned short int attr_box_left;" can be used to indicate the top index of the top left portion of a bounding box. The syntax of "unsigned short int attr_box_top;" can be used to indicate the top index of the top-left point of the bounding box. The syntax of "unsigned short int attr_box_width;" can be used to indicate the width of attribute's bounding box. The syntax of "unsigned short int attr_box_height;" can be used to indicate the height of attribute's bounding box.

Figure 13:
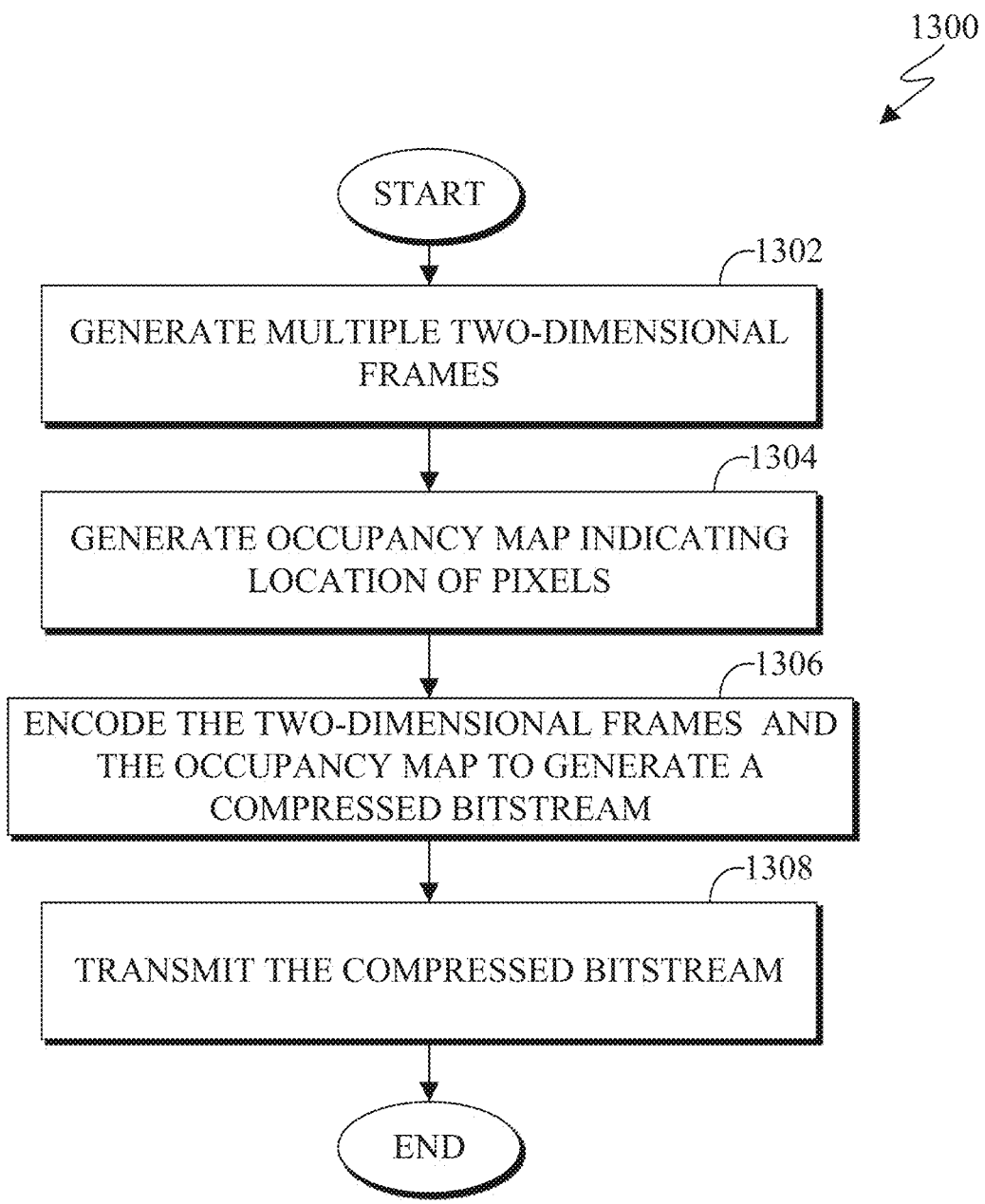
FIG. 13 illustrates an example flowchart for encoding a point cloud in accordance with an embodiment of this disclosure.

FIG. 13 illustrates an example flowchart for encoding a point cloud in accordance with an embodiment of this disclosure. FIG. 13 depicts flowchart 1300, for point cloud encoding. For example, the process depicted in FIG. 13 is described as implemented by the server 104 of FIG. 1, any one of client devices 106-114 of FIG. 1, the server 200 00 of FIG. 2, the electronic device 300 of FIG. 3, encoder 500 of FIG. 5A, encoder 600 of FIG. 6A, encoder 700 of FIG. 7A or encoder 800 of FIG. 8A.

The process begins with an encoder, such encoder 500, 600, 700, or 800 generating multiple 2-D frames from a point cloud (1302). The two-dimensional frames include at least a first frame representing a geometry of points in the three-dimensional point cloud. The two-dimensional frames also include a second frame representing a texture of points in the three-dimensional point cloud such as color, texture, normal, reflectace, and the like. In certain embodiments, the location of each point in the three-dimensional point cloud is mapped onto the first frame to indicate the geometry of points in the three-dimensional point cloud. In certain embodiments, the texture attribute of each point in the three-dimensional point cloud is mapped onto the second frame to indicate the texture of points in the three-dimensional point cloud.

In certain embodiments, the processor is further configured to analyze the three-dimensional point cloud at a plurality of positions along a first axis in order to store each point in the three-dimensional point cloud along a second and third axis that correspond to each position along the first axis. Each point is stored in row of the first frame that corresponds the position along the first axis. In certain embodiments, the first axis is the longest dimension of the three-dimensional point cloud.

The process generates an occupancy map that indicates locations of pixels on the 2-D frames (1304). In certain embodiments, the occupancy map is similar to the binary mask that indicates valid points on each frame. For example, the generated occupancy map can overlay each frame to indicate whether each pixel is part of the point cloud.

The process also encodes the 2-D frames and the occupancy map to generate a compressed bitstream (1308). The process combines each frame and the occupancy map to compress each object in order to generate the bitstream. In certain embodiments, the encoded frames are compressed using a video or image codec. The process then transmits the compressed bitstream (1310).

Figure 14:
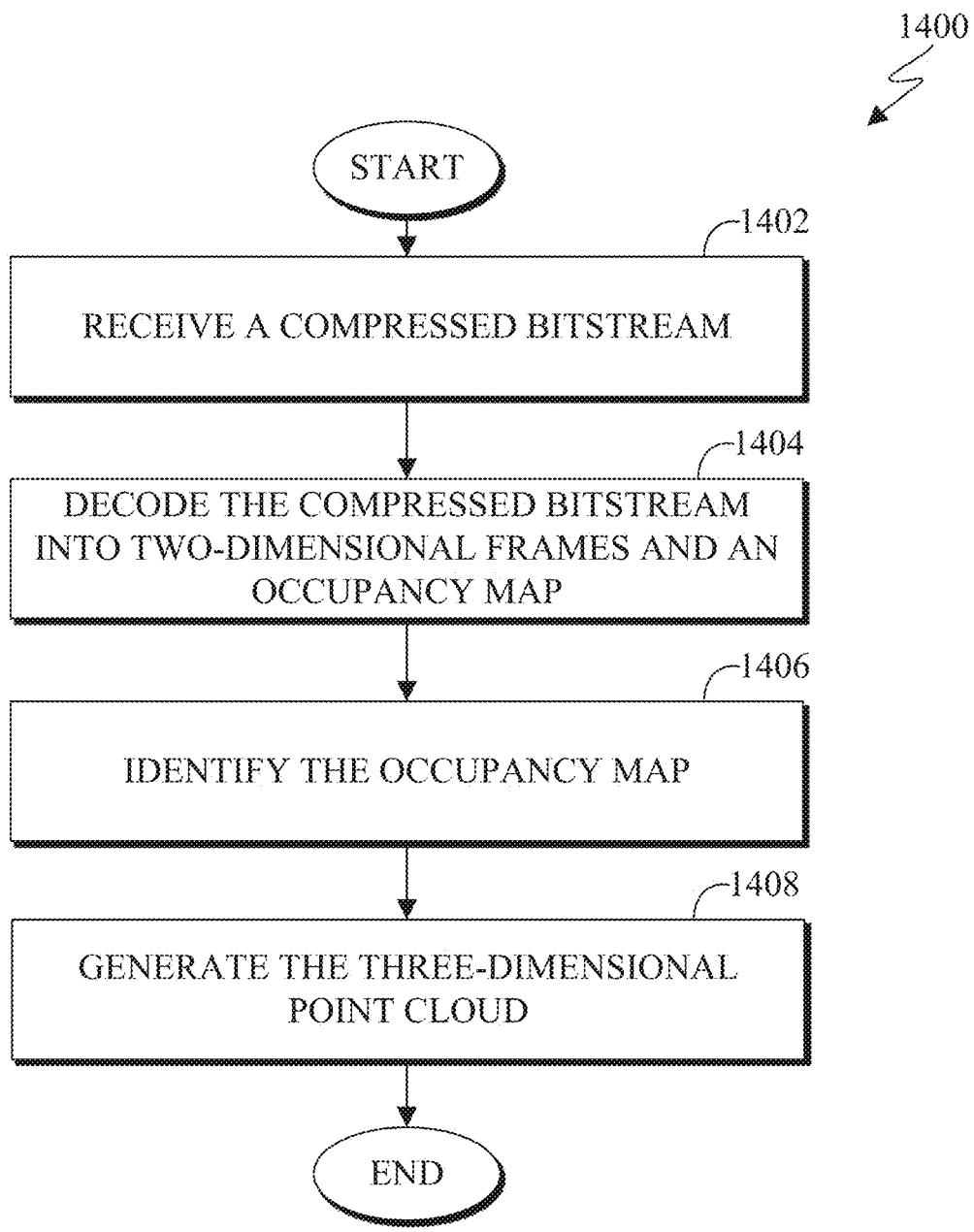
FIG. 14 illustrates an example flowchart for decoding a point cloud in accordance with an embodiment of this disclosure.

FIG. 14 illustrates an example flowchart for decoding a point cloud in accordance with an embodiment of this disclosure. For example, the process depicted in FIG. 14 is described as implemented by any one of the client devices 106-114 of FIG. 1, the electronic device 300 of FIG. 3, decoder 550 of FIG. 5B, decoder 650 of FIG. 6B, decoder 750 of FIG. 7B or decoder 850 of FIG. 8B.

The process begins with a decoder, such decoder 550, 650, 750, or 850 receiving a compressed bitstream (1402). The received bitstream can include an encoded point cloud that was mapped into two-dimensional frames that was compressed for transmission.

The process decodes the compressed bitstream into 2-D frames and a occupancy map (1404). In certain embodiments the occupancy map is not included in the bitstream. The two-dimensional frames include at least a first frame representing a geometry of points in a three-dimensional point cloud. The two-dimensional frames also include a second frame representing a texture of points in the three-dimensional point cloud. In certain embodiments, a first series of frames, each representing the geometry of points, is decompressed to generate the first frame that includes the geometry of points. Similarly, a second series of frames, each representing the texture of points of the three-dimensional point cloud is decompressed to generate the second frame that includes the texture of points.

The process then identifies or decodes an occupancy map that is included in the decoded bit stream (1406). The occupancy map indicates locations of pixels in the two-dimensional frames that represent each point in the three-dimensional point cloud. In certain embodiments, the occupancy map is similar to the binary mask that indicates valid points on each frame. For example, the occupancy map can overlay each frame to indicate whether each pixel is part of the point cloud.

The process then generates the three-dimensional point cloud using the occupancy map based on the multiple frames (1408). In certain embodiments, the location of each point of the first frame is mapped in order to reconstruct the geometry of points in a three-dimensional point cloud. Similarly, the texture attribute of each point in the second frame is mapped in order to reconstruct the texture of points in the three-dimensional point cloud. In certain embodiments, the texture attribute of each point is mapped based on the mapped location of each point that indicates the geometry of points in three-dimensional point cloud.

In certain embodiments, the process analyzes each row of the first frame to identify a first axis. Each point that is identified is positioned in each row that corresponds a point of the three-dimensional point cloud at a position along the first axis. The three-dimensional point cloud is generated by positioning each point at a second axis and a third axis that corresponds to each row of the first frame. In certain embodiments, the process identifies the longest dimension as the first axis.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A decoding device for point cloud decoding, the decoding device comprising:
   a communication interface configured to receive a compressed bitstream; and
   a processor operably coupled to the communication interface, wherein the processor is configured to:
      decode the compressed bitstream into two-dimensional frames, wherein the two-dimensional frames include at least a first frame that indicates geometric locations of points in a three-dimensional point cloud and a second frame that indicates attribute information of the points in the three-dimensional point cloud, wherein the first frame and the second frame include valid pixels that correspond to the points of the three-dimensional point cloud and invalid pixels that do not represent any of the points of the three-dimensional point cloud, and decode an occupancy map from the compressed bitstream that indicates locations of the valid pixels and the invalid pixels in the two-dimensional frames;

identify from the occupancy map the valid pixels in the two-dimensional frames that represent each point in the three-dimensional point cloud, and the invalid pixels in the two-dimensional frames that do not represent any of the points of the three-dimensional point cloud; and reconstruct the three-dimensional point cloud from the valid pixels of the two-dimensional frames, as identified by the occupancy map.

2. The decoding device of claim 1, wherein to reconstruct the three-dimensional point cloud, the processor is further configured to:

map a location of the valid pixels in the first frame to reconstruct the points of the three-dimensional point cloud; and after reconstructing the geometric locations of the points, map the attribute information of the valid pixels in the second frame to the points of the three-dimensional point cloud, wherein one of the valid pixels at a location in the second frame provides the attribute information of a point that is represented by a pixel at a corresponding location in the first frame.

3. The decoding device of claim 1, wherein to decode the compressed bitstream, the processor is further configured to:

decompress a first series of frames, each representing the geometric locations of the points of the three-dimensional point cloud, to generate the first frame; and decompress a second series of frames, each representing the attribute information of the points of the three-dimensional point cloud, to generate the second frame.

4. The decoding device of claim 1, wherein, the processor is further configured to identify auxiliary information to relate the valid pixels in the first frame and the valid pixels in the second frame to the points of the three-dimensional point cloud, the auxiliary information indicates the geometric locations and the attribute information of the points in the three-dimensional point cloud to each row in the first and second frame.

5. The decoding device of claim 1, wherein to reconstruct the three-dimensional point cloud, the processor is further configured to:

analyze a row of the first frame to identify a first axis, wherein the valid pixels that are positioned in the row of the first frame correspond to the points of the three-dimensional point cloud along the first axis; and generate the three-dimensional point cloud by positioning the points in three-dimensional space corresponding to the first axis, a second axis, and a third axis, based on a location of the valid pixels that within the row of the first frame.

6. The decoding device of claim 5, wherein the processor is configured to:

identify that a longest dimension of the three-dimensional point cloud is the first axis; and generate the three-dimensional point cloud by positioning the points that correspond to the row of the first frame along the longest dimension of the three-dimensional point cloud.

7. The decoding device of claim 1, wherein the processor is further configured to identify color values representing the points of the three-dimensional point cloud as three components in the second frame.

8. An encoding device for point cloud encoding, the encoding device comprising:

a processor configured to:

generate, from a three-dimensional point cloud, multiple two-dimensional frames, the two-dimensional frames including at least a first frame that indicates geometric locations of points in the three-dimensional point cloud and a second frame that indicates attribute information of the points in the three-dimensional point cloud, wherein the first frame and the second frame include valid pixels that correspond to the points of the three-dimensional point cloud and invalid pixels that do not represent any of the points of the three-dimensional point cloud;

generate an occupancy map indicating locations of the valid pixels and the invalid pixels in the two-dimensional frames; and encode the two-dimensional frames and the occupancy map to generate a compressed bitstream; and a communication interface operably coupled to the processor, wherein the communication interface is configured to transmit the compressed bitstream.

9. The encoding device of claim 8, wherein to generate the two-dimensional frames, the processor is further configured to:

map a location of each of the points in the three-dimensional point cloud onto the first frame to indicate the geometric locations of the points in the three-dimensional point cloud; and map the attribute information of each of the points in the three-dimensional point cloud onto the second frame to indicate the attribute information associated with the points, wherein the attribute information associated with a first point in the three-dimensional point cloud is mapped to a location in the second frame that matches the location of the geometric location of the first point in the first frame.

10. The encoding device of claim 8, wherein to encode the two-dimensional frames, the processor is further configured to:

compress a first series of frames, each representing the geometric locations of the points of the three-dimensional point cloud, to generate a first compressed frame that includes the geometric locations of the points; and compress a second series of frames, each representing the attribute information of the points of the three-dimensional point cloud, to generate a second compressed frame that includes the attribute information of the points.

11. The encoding device of claim 8, wherein the processor is further configured to generate auxiliary information to relate the geometric location of the points and the attribute information associated with the points in the three-dimensional point cloud to the multiple two-dimensional frames, the auxiliary information indicates the geometric location and the attribute information of the points in the three-dimensional point cloud to each row in the first and second frame.

12. The encoding device of claim 8, wherein to generate the multiple two-dimensional frames, the processor is further configured to:

analyze the three-dimensional point cloud at a plurality of positions along a first axis; and store a representation of the points of the three-dimensional point cloud that are located along a second and third axis and positioned along the first axis, wherein the points are stored in a row of the first frame that corresponds the position along the first axis.

13. The encoding device of claim 12, wherein the processor is further configured to:

determine a longest dimension of the three-dimensional point cloud;

analyze the three-dimensional point cloud at the plurality of positions along the longest dimension; and store, in the row of the first frame, the representation of the points of the three-dimensional point cloud that are located along the second and third axis and positioned along the longest dimension of the three-dimensional point cloud.

14. The encoding device of claim 8, wherein:

the second frame representing the attribute information of the points indicates a color of each of the points of the three-dimensional point cloud, and the processor is further configured to store a value representing the color as three components in the second frame.

15. A method for point cloud encoding, the method comprising:

generating, from a three-dimensional point cloud, multiple two-dimensional frames, the two-dimensional frames including at least a first frame that indicates geometric locations of points in the three-dimensional point cloud and a second frame that indicates attribute information of the points in the three-dimensional point cloud, wherein the first frame and the second frame include valid pixels that correspond to the points of the three-dimensional point cloud and invalid pixels that do not represent any of the points of the three-dimensional point cloud;

generating an occupancy map indicating locations of the valid pixels and the invalid pixels in the two-dimensional frames; and encoding the two-dimensional frames and the occupancy map to generate a compressed bitstream; and transmitting the compressed bitstream.

16. The method of claim 15, wherein generating the two-dimensional frames, the method comprises:

mapping a location of each of the points in the three-dimensional point cloud onto the first frame to indicate the geometric locations of the points in the three-dimensional point cloud; and mapping the attribute information of each of the points in the three-dimensional point cloud onto the second frame to indicate the attribute information associated with the points, wherein the attribute information associated with a first point in the three-dimensional point cloud is mapped to a location in the second frame that matches the location of the geometric location of the first point in the first frame.

17. The method of claim 15, wherein encoding the two-dimensional frames, the method comprises:

compressing a first series of frames, each representing the geometric locations of the points of the three-dimensional point cloud, to generate a first compressed frame that includes the geometric locations of the points; and compressing a second series of frames, each representing the attribute information of the points of the three-dimensional point cloud, to generate a second compressed frame that includes the attribute information of the points.

18. The method of claim 15, further comprises generating auxiliary information to relate the geometric location of the points and the attribute information associated with the points in the three-dimensional point cloud to the multiple two-dimensional frames, the auxiliary information indicates the geometric location and the attribute information of the points in the three-dimensional point cloud to each row in the first and second frame.

19. The method of claim 15, wherein generating the multiple two-dimensional frames, the method comprises:

analyzing the three-dimensional point cloud at a plurality of positions along a first axis; and storing a representation of the points of the three-dimensional point cloud that are located along a second and third axis and positioned along the first axis, wherein the points are stored in a row of the first frame that corresponds the positions along the first axis.

20. The method of claim 19, further comprises:

determining a longest dimension of the three-dimensional point cloud;

analyzing the three-dimensional point cloud at the plurality of positions along the longest dimension; and storing, in the row of the first frame, the representation of the points of the three-dimensional point cloud that are located along the second and third axis and positioned along the longest dimension of the three-dimensional point cloud.

* * * * *